United States Patent
Christiansson et al.

(10) Patent No.: US 10,019,113 B2
(45) Date of Patent: Jul. 10, 2018

(54) TOMOGRAPHIC PROCESSING FOR TOUCH DETECTION

(71) Applicant: Flatfrog Laboratories AB, Lund (SE)

(72) Inventors: Tomas Christiansson, Torna-hällestad (SE); Nicklas Ohlsson, Bunkeflostrand (SE); Markus Andreasson, Lund (SE)

(*) Notice: Subject to any disclaimer, the term of this patent is extended or adjusted under 35 U.S.C. 154(b) by 5 days.

(21) Appl. No.: 14/783,732

(22) PCT Filed: Apr. 9, 2014

(86) PCT No.: PCT/SE2014/050435
§ 371 (c)(1),
(2) Date: Oct. 9, 2015

(87) PCT Pub. No.: WO2014/168567
PCT Pub. Date: Oct. 16, 2014

(65) Prior Publication Data
US 2016/0299593 A1     Oct. 13, 2016

(30) Foreign Application Priority Data
Apr. 11, 2013   (SE) ...................................... 1350458

(51) Int. Cl.
*G06F 3/042*     (2006.01)
*G06F 3/041*     (2006.01)

(52) U.S. Cl.
CPC ............ *G06F 3/042* (2013.01); *G06F 3/0416* (2013.01); *G06F 2203/04109* (2013.01)

(58) Field of Classification Search
CPC .................... G06F 3/041–3/047; G06F 3/0428
See application file for complete search history.

(56) References Cited

U.S. PATENT DOCUMENTS

| | | |
|---|---|---|
| 3,440,426 A | 4/1969 | Bush |
| 3,553,680 A | 1/1971 | Cooreman |

(Continued)

FOREIGN PATENT DOCUMENTS

| | | |
|---|---|---|
| CN | 201233592 Y | 5/2009 |
| CN | 101644854 A | 2/2010 |

(Continued)

OTHER PUBLICATIONS

International Search Report dated Jun. 12, 2014, in connection with related PCT/SE2014/050435.

(Continued)

*Primary Examiner* — Hang Lin
(74) *Attorney, Agent, or Firm* — Knobbe, Martens, Olson & Bear, LLP

(57) ABSTRACT

A signal processor in a touch-sensitive apparatus generates a 2D representation of touch interaction on a touch surface by tomographic processing. The signal processor generates observed values for detection lines that correspond to signal propagation paths across the touch surface. The observed values correspond to sampling points in a sample space defined by a first dimension representing a rotation angle of the detection line on the touch surface and a second dimension representing a distance of the detection line from a predetermined origin on the touch surface. The signal processor processes the observed values, by interpolation in the sample space, to generate estimated values for matched sampling points in the sample space using a tomographic reconstruction function.

18 Claims, 17 Drawing Sheets

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergstrom |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |

(56) References Cited

U.S. PATENT DOCUMENTS

| | | |
|---|---|---|
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |

(56) References Cited

U.S. PATENT DOCUMENTS

| | | |
|---|---|---|
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1* | 2/2013 | Christiansson ....... G06F 3/0421 345/173 |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1 | 6/2013 | Holmgren et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |

(56) References Cited

U.S. PATENT DOCUMENTS

| | | |
|---|---|---|
| 2013/0241887 A1 | 9/2013 | Sharma |
| 2013/0249833 A1* | 9/2013 | Christiansson ........ G06F 3/0428 345/173 |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1* | 10/2014 | Ohlsson ................. G06F 3/042 345/173 |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010004473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | 2005026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |

(56) References Cited

FOREIGN PATENT DOCUMENTS

| | | |
|---|---|---|
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | 2010015410 A2 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | 2011028169 A1 | 3/2011 |
| WO | WO 2011/028170 A1 | 3/2011 |
| WO | 2011049512 A1 | 4/2011 |
| WO | WO 2011/049511 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | 2011139213 A1 | 11/2011 |
| WO | WO 2012/002894 A1 | 1/2012 |
| WO | WO 2012/010078 A1 | 1/2012 |
| WO | 2012050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | 2013062471 A2 | 5/2013 |
| WO | WO 2013/089622 A2 | 6/2013 |
| WO | 2013133756 A1 | 9/2013 |
| WO | 2013133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |

OTHER PUBLICATIONS

International Search Report dated Jul. 1, 2014, in connection with related PCT/SE2014/050437.
International Search Report dated Jul. 1, 2014, in connection with related PCT/SE2014/050438.
Ahn, Y., et al., "A slim and wide multi-touch tabletop interface and its applications," BigComp2014, IEEE, 2014, in 6 pages.
Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
Johnson, M., "Enhanced Optical Touch Input Panel", IBM Technical Disclosure Bulletin, 1985, in 3 pages.
Kak, et al., "Principles of Computerized Tomographic Imaging", Institute of Electrical Engineers, Inc., 1999, in 333 pages.
The Laser Wall, MIT, 1997, http://web.media.mit.edu/joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.

* cited by examiner

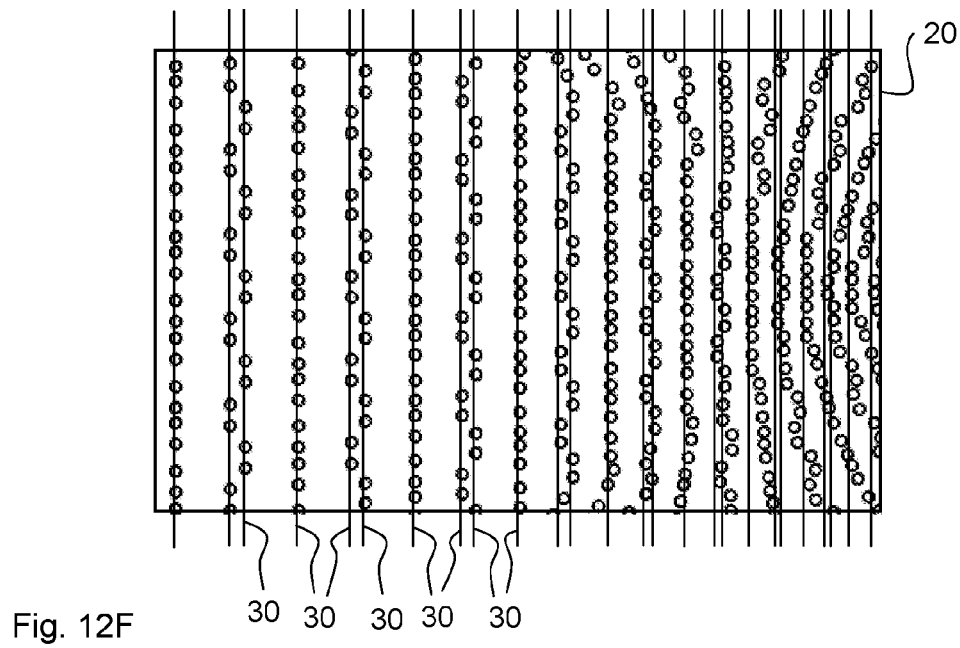
Fig. 12F    30  30   30 30   30
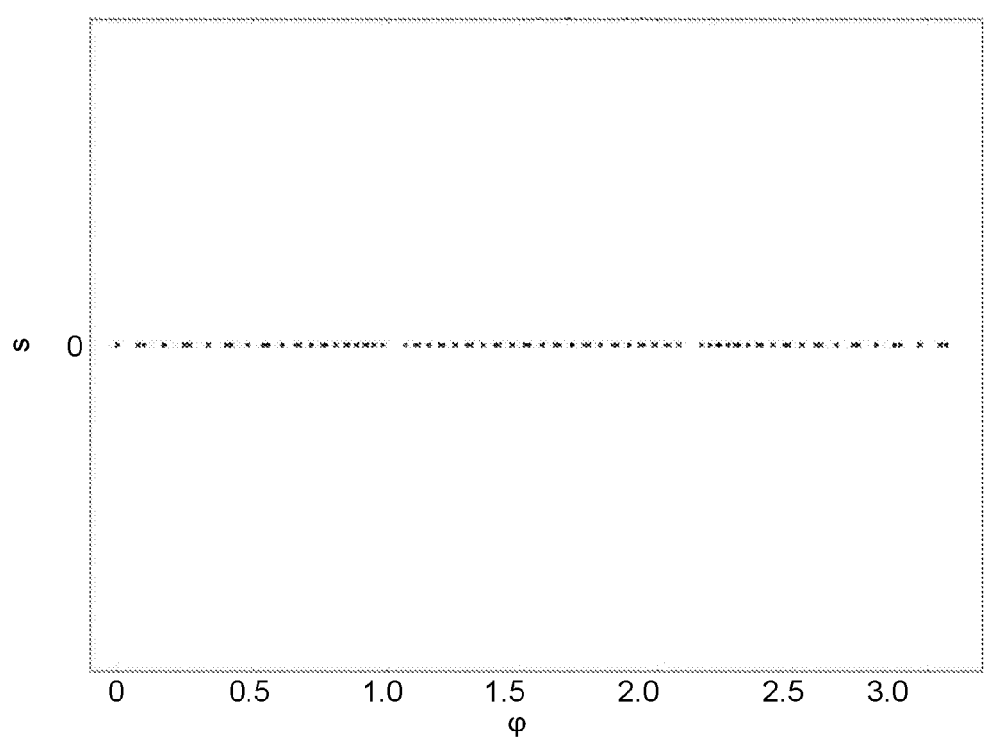
Fig. 13A

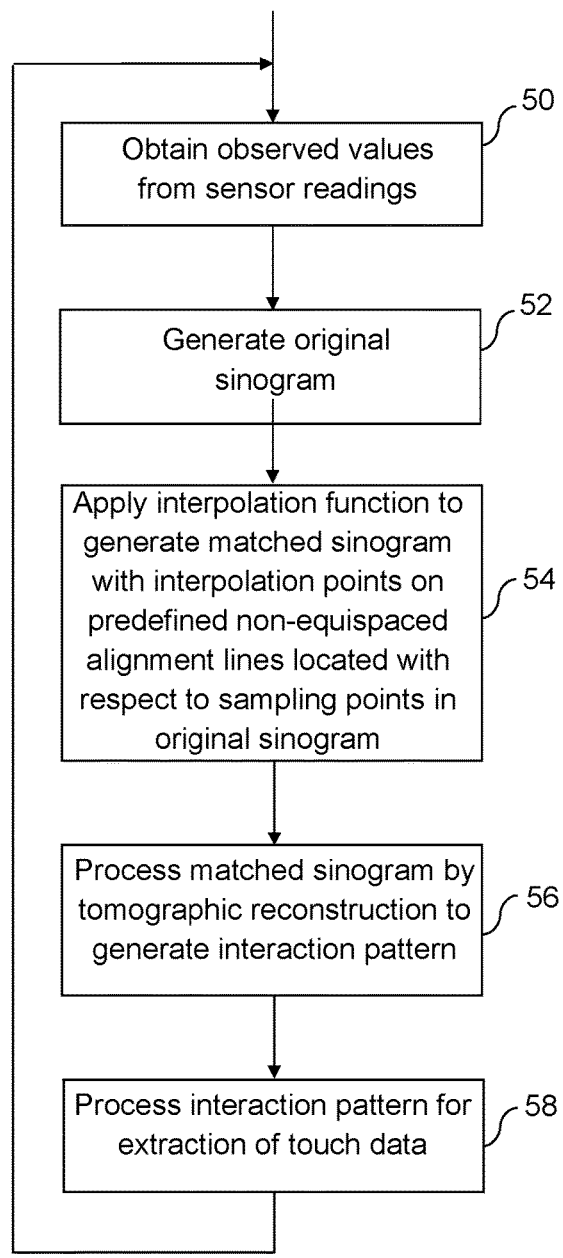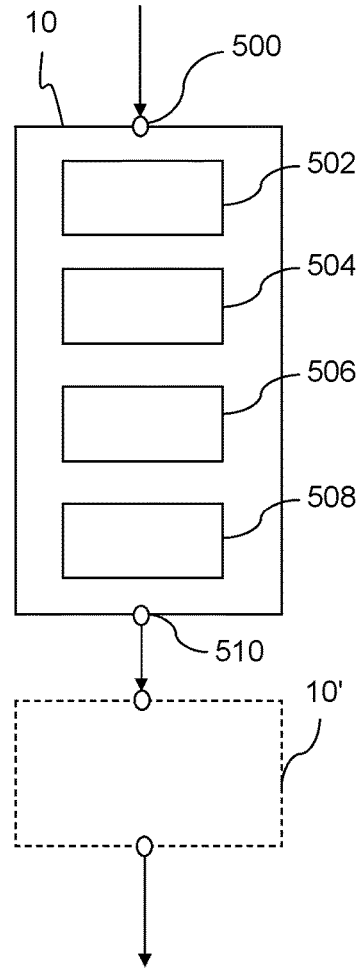
Fig. 14A                    Fig. 14B

TOMOGRAPHIC PROCESSING FOR TOUCH DETECTION

CROSS-REFERENCE TO RELATED APPLICATIONS

The present application claims the benefit of Swedish patent application No. 1350458-4, filed 11 Apr. 2013.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch systems are actuated by a touching object such as a finger or stylus, either in direct contact or through proximity (i.e. without contact) with a touch surface. Touch systems are for example used as touch pads of laptop computers, in control panels, and as overlays to displays on e.g. hand held devices, such as mobile telephones. A touch system that is overlaid on or integrated in a display is also denoted a "touch screen". Many other applications are known in the art.

To an increasing extent, touch systems are designed to be able to detect two or more touches simultaneously, this capability often being referred to as "multi-touch". There are numerous known techniques for providing multi-touch sensitivity, e.g. by using cameras to capture light scattered off the point(s) of touch on a panel, or by incorporating resistive wire grids, capacitive sensors, strain gauges, etc into a panel.

US2004/0252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse reconstruction of the light field across the panel surface is then created by geometrically back-tracing and triangulating all attenuations observed in the received light. This is stated to result in data regarding the position and size of each contact area.

US2009/0153519 discloses a panel capable of conducting signals. A "tomograph" is positioned adjacent to the panel with signal flow ports arrayed around the border of the panel at discrete locations. Signals measured at the signal flow ports are arranged in a sinogram (b) and tomographically processed to generate a two-dimensional representation (x) of the conductivity on the panel, whereby touching objects on the panel surface can be detected. The presented technique for tomographic reconstruction is based on a linear model of the tomographic system, Ax=b. The system matrix A is calculated at factory, and its pseudo inverse $A^{-1}$ is calculated using Truncated SVD algorithms and operated on a sinogram b of measured signals to yield the two-dimensional (2D) representation of the conductivity: $x=A^{-1}b$. The suggested method is both demanding in the term of processing and lacks suppression of high frequency components, possibly leading to much noise in the 2D representation. US2009/0153519 also makes a general reference to Computer Tomography (CT). CT methods are well-known imaging methods which have been developed for medical purposes. CT methods employ digital geometry processing to reconstruct an image of the inside of an object based on a large series of projection measurements through the object.

WO2011/139213 discloses an improved technique for tomographic reconstruction based on signals from a touch system that operates by transmission of signals across a touch surface. The signals, which represent detected energy on a plurality of actual detection lines across the touch surface, are processed to generate a set of matched samples, which are indicative of estimated detected energy for fictitious detection lines that have a location on the touch surface that matches a standard geometry for tomographic reconstruction. This technique enables the touch system to be designed with any arrangement of actual detection lines across the touch surface, while still allowing for the use of conventional tomographic reconstruction algorithms, which generate an interaction pattern that represents the location of objects on the touch surface.

As will be described with reference to FIGS. 6A-6B in the detailed description of the present application, the Applicant has identified a need to improve the spatial resolution of the interaction pattern that is obtained when the teachings of WO2011/139213 are applied to generate fictitious detection lines that are matched to a parallel geometry on the touch surface. An improved spatial resolution may be achieved by increasing the number of actual detection lines for a given size of the touch surface. However, this comes with added cost and complexity since the number of emitters and sensors needs to be increased. Furthermore, increasing the number of detection lines will increase, significantly, the number of computations in the tomographic reconstruction processing. In touch systems, the available time for generating the interaction pattern and identifying the touches is limited, since the touch detection generally is performed in real time. At the same time, the touch system may be restricted in terms of processing speed or storage capacity, e.g. due to constraints imposed by a desire to reduce costs, limit power consumption, provide a certain form factor, etc. There is thus a need to improve the spatial resolution for a given number of detection lines.

SUMMARY

It is an objective of the invention to at least partly overcome one or more limitations of the prior art.

Another objective is to improve the spatial resolution of the interaction pattern generated by tomographic processing of signals acquired by projection measurements in a touch-sensitive apparatus.

One or more of these objectives, as well as further objectives that may appear from the description below, are at least partly achieved by means of a touch-sensitive apparatus, a method, a computer-readable medium and a device according to the independent claims, embodiments thereof being defined by the dependent claims.

A first aspect of the invention is a touch-sensitive apparatus comprising: a panel configured to conduct signals from a plurality of incoupling ports to a plurality of outcoupling ports, thereby defining detection lines that extend across a non-circular touch surface on the panel between pairs of incoupling and outcoupling ports; at least one signal generator coupled to the incoupling ports to generate the signals; at least one signal detector coupled to the outcoupling ports to generate an output signal; and a signal processor. The signal processor is connected to receive the output signal and configured to: process the output signal to generate a set of observed values for at least a subset of the detection lines, wherein the observed values correspond to sampling points in a two-dimensional sample space, in which a first dimension is defined by an angle parameter that represents a rotation angle of the detection line in the plane of the panel, and a second dimension is defined by a distance parameter that represent a distance of the detection line in the plane of the panel from a predetermined origin; process the observed values for the sampling points, by interpolation in the two-dimensional sample space, to generate estimated values for matched sampling points in the two-dimensional sample space, wherein the matched sampling points are arranged to form consecutive columns in the two-dimensional sample space, such that the columns extend in the second dimension and are spaced in the first dimension, and wherein at least a subset of the consecutive columns are non-equispaced and arranged to coincide with alignment lines that are defined by the locations of the sampling points in the two-dimensional sample space; and operate a tomographic reconstruction function on the estimated values for the matched sampling points to generate a two-dimensional representation of touch interaction on the touch surface.

The first aspect is based on an insight, obtained through extensive experimentation, that the spatial resolution of the two-dimensional representation may be improved by reducing the degree of interpolation in the first dimension, i.e. with respect to the angle parameter, when the estimated values for the matched sampling points are generated. This is generally achieved, when designing the interpolation to be used when the signal processor processes the observed values, by allowing the spacing between consecutive columns of matched sampling points to be non-equispaced in the sample space, and by intentionally selecting the placement of the individual columns of matched sampling points with respect to alignment lines that are given by the sampling points in the sample space. The term "non-equispaced" is used in its ordinary meaning to define that the spacing differs between different columns among the set of consecutive columns. It does not imply that all consecutive columns should have different spacing, but that at least one pair of consecutive columns has a different spacing than other pairs of consecutive columns.

The following embodiments define different concepts for arranging the columns of matched sampling points and for generating the estimated values for the matched sampling points, so as to improve the spatial resolution, possibly without significantly increasing the number of processing operations.

In one embodiment, the respective alignment line is defined to extend through at least two sampling points in the two-dimensional sample space.

In one embodiment, the respective alignment line is defined to extend through at least two sampling points that are aligned with respect to the first dimension in the two-dimensional sample space.

In one embodiment, the respective alignment line is defined by sampling points that represent detection lines that extend in parallel across the touch surface.

In one embodiment, the touch surface is quadrilateral and comprises at least two opposite sides that are essentially parallel and at least two adjacent sides, and wherein the incoupling and outcoupling ports are arranged along a perimeter of the touch surface, such that the detection lines extend between the at least two opposite sides and between the at least two adjacent sides of the touch surface, wherein the alignment lines are defined, preferably exclusively, by the detection lines that extend between the at least two opposite sides.

In one embodiment with quadrilateral touch surface, the detection lines that extend between the at least two opposite sides correspond to sampling points that are located within one or more confined sub-portions of the two-dimensional sample space, wherein the sampling points within the one or more confined sub-portions form a plurality of columnated clusters of sampling points, and wherein the alignment lines are defined to be co-located with a respective columnated cluster of sampling points. The columnated clusters may correspond to disjoint sets of sampling points within the one or more confined sub-portions.

In one embodiment, the columnated clusters are spaced-apart in the first dimension within the one or more confined sub-portions.

In one embodiment, the columnated clusters are identifiable by cluster analysis among the sampling points within the one or more sub-portions, wherein the cluster analysis is configured to identify a predefined number of columnated clusters by clustering the sampling points only based on the value of the angle parameter for the respective sampling point.

In one embodiment with quadrilateral touch surface, the incoupling and outcoupling ports are arranged such that the detection lines that extend between the at least two opposite sides of the touch surface form groups of detection lines with mutually different rotation angles in the plane of the panel, wherein the detection lines within the respective group have mutually similar rotational angles, and wherein the columnated clusters correspond to the groups of detection lines. At least a subset of the groups may consist of mutually parallel detection lines, at least a subset of the columnated clusters may consist of a respective column of sampling points in the two-dimensional sample space, and at least a subset of the alignment lines may be defined to coincide with the columns of sampling points.

In one embodiment, the signal processor is configured to apply a first interpolation function to generate the estimated values for matched sampling points that are located within at least one of the one or more confined sub-portions, and apply a second interpolation function to generate the estimated values for matched sampling points that are located outside the one or more confined sub-portions. In one implementation, the first interpolation function is configured to generate the estimated value for the respective matched sampling point on a given alignment line by interpolation only among observed values for the sampling points within the columnated cluster that defines the given alignment line, and the second interpolation function is configured to generate the estimated value for the respective matched sampling point by interpolation among observed values for the sampling points that are located outside the one or more confined sub-portions. Alternatively or additionally, each columnated cluster may consist of a column of sampling points in the two-dimensional sample space, and the respective alignment line may be defined to coincide with a respective column of sampling points, and the first interpolation function may configured to generate the estimated value for the respective matched sampling point by interpolation only among sampling points that are only displaced in the second dimension from the respective matched sampling point, and the second interpolation function may be configured to generate the estimated value for the respective matched sampling point by interpolation among observed values for sampling points that are displaced in any of the first and second dimensions from the respective matched sampling point.

In one embodiment, the signal processor is configured to generate the estimated value for the respective matched sampling point as a weighted combination of the observed values for a respective set of sampling points. For example, the signal processor may be configured to generate the weighted combination for the respective matched sampling point by applying a weight factor to the observed value for each sampling point in the respective set of sampling points, and the weight factor may be a function of a distance in the two-dimensional sample space between the respective matched sampling point and said each sampling point.

In one embodiment, the signal processor is configured to generate the observed values to be indicative of a decrease in signal energy caused by objects in contact or proximity with the touch surface.

In one embodiment, said signals comprise one of electrical energy, light, magnetic energy, sonic energy and vibration energy.

In one embodiment, the panel defines a top surface and an opposite, bottom surface, wherein said at least one signal generator is optically coupled to the panel at the incoupling ports and arranged to generate light that propagates inside the panel by internal reflection between the top and bottom surfaces from the incoupling ports to the outcoupling ports, wherein said at least one signal detector is optically coupled to the panel at the outcoupling ports to receive the propagating light, and wherein the touch-sensitive apparatus is configured such that the propagating light is locally attenuated by one or more objects that are brought into contact or proximity with at least one of the top and bottom surfaces.

A second aspect of the invention is a method for enabling touch determination, which comprises the steps of: receiving an output signal generated by at least one signal detector which is coupled to a plurality of outcoupling ports on a panel, which is configured to conduct signals from a plurality of incoupling ports on the panel to the plurality of outcoupling ports, so as to define detection lines that extend across a non-circular touch surface on the panel between pairs of incoupling and outcoupling ports; processing the output signal to generate a set of observed values for at least a subset of the detection lines, wherein the observed values correspond to sampling points in a two-dimensional sample space, in which a first dimension is defined by an angle parameter that represents a rotation angle of the detection line in the plane of the panel, and a second dimension is defined by a distance parameter that represent a distance of the detection line in the plane of the panel from a predetermined origin; processing the observed values for the sampling points, by interpolation in the two-dimensional sample space, to generate estimated values for matched sampling points in the two-dimensional sample space, wherein the matched sampling points are arranged to form consecutive columns in the two-dimensional sample space, such that the columns extend in the second dimension and are spaced in the first dimension, and wherein at least a subset of the consecutive columns are non-equispaced and arranged to coincide with alignment lines that are defined by the locations of the sampling points in the two-dimensional sample space; and operating a tomographic reconstruction function on the estimated values for the matched sampling points to generate a two-dimensional representation of touch interaction on the touch surface.

A third aspect of the invention is a computer-readable medium comprising program instructions which, when executed by a processing unit, is adapted to carry out the method according to the second aspect.

A fourth aspect of the invention is a device for enabling touch determination, which comprises: an input for receiving an output signal generated by at least one signal detector which is coupled to a plurality of outcoupling ports on a panel, which is configured to conduct signals from a plurality of incoupling ports on the panel to the plurality of outcoupling ports, so as to define detection lines that extend across a non-circular touch surface on the panel between pairs of incoupling and outcoupling ports; means for processing the output signal to generate a set of observed values for at least a subset of the detection lines, wherein the observed values correspond to sampling points in a two-dimensional sample space, in which a first dimension is defined by an angle parameter that represents a rotation angle of the detection line in the plane of the panel, and a second dimension is defined by a distance parameter that represent a distance of the detection line in the plane of the panel from a predetermined origin; means for processing the observed values for the sampling points, by interpolation in the two-dimensional sample space, to generate estimated values for matched sampling points in the two-dimensional sample space, wherein the matched sampling points are arranged to form consecutive columns in the two-dimensional sample space, such that the columns extend in the second dimension and are spaced in the first dimension, and wherein at least a subset of the consecutive columns are non-equispaced and arranged to coincide with alignment lines that are defined by the locations of the sampling points in the two-dimensional sample space; and means for operating a tomographic reconstruction function on the estimated values for the matched sampling points to generate a two-dimensional representation of touch interaction on the touch surface.

Any one of the above-identified embodiments of the first aspect may be adapted and implemented as an embodiment of the second to fourth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 12F is an enlarged view of FIG. 12C.

FIGS. 13A-13B illustrate all sampling points that correspond to detection lines between opposite sides in FIG. 12A and FIG. 4A, respectively, as a function of angle only.

FIG. 14A is a flow chart of a method for enabling touch detection according to an embodiment of the invention, and FIG. 14B is a block diagram of a control unit that implements the method in FIG. 14A.

DETAILED DESCRIPTION OF EXAMPLE EMBODIMENTS

Figure 1A:
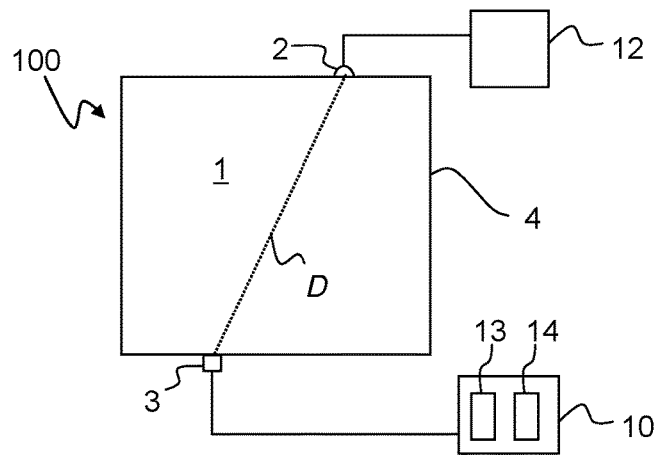
FIGS. 1A-1C are a top plan views of a touch-sensitive apparatus to illustrate the concept of projection measurements.

The present invention is directed to techniques that may improve the accuracy of tomographic reconstruction as applied for detecting touches based on projection measurements in a touch-sensitive apparatus. Throughout the description, the same reference numerals are used to identify corresponding elements.

A touch-sensitive apparatus that uses projection measurements is operated to transmit energy of some form across a touch surface in such a way that an object that is brought into close vicinity of, or in contact with, the touch surface does not block the transmission of energy but rather causes a local decrease in the transmitted energy. The apparatus repeatedly performs projection measurements, in which the transmitted energy on a large number of propagation paths across the touch surface is measured, and a subsequent image reconstruction, in which observed values acquired in the projection measurements are processed by tomographic reconstruction to generate a two-dimensional representation of the interaction on the touch surface.

FIG. 1A is a top plan view of such a projection-type apparatus 100 and illustrates a single emitter 2 and a single sensor 3 which are coupled to a conductive panel 4. The emitter 2 is activated to generate a signal which is transmitted, in the panel 4, on a well-defined propagation path or "detection line" D to the sensor 3. Each such detection line D extends from a well-defined incoupling port on the panel 4, where the signal enters the panel 4, to a well-defined outcoupling port on the panel 4, where the signal leaves the panel 4. The top surface of the panel 4 defines a touch surface 1. Any object that touches the touch surface 1 along the extent of the detection line D will decrease the energy of the signal, as measured by the sensor 3. Although not shown in FIG. 1A, the apparatus 100 includes an arrangement of numerous emitters 2 and sensors 3, which are distributed on the panel 4 to define a more or less dense grid of intersecting detection lines D, each corresponding to a signal being emitted by an emitter 2 and detected by a sensor 3. As used herein, the "touch surface" 1 refers to a surface area on the panel 4 that is delimited by the incoupling and outcoupling ports, i.e. the end points of the detection lines D. Thus, the extent and shape of the touch surface 1 is defined by the placement of the incoupling and outcoupling ports on the panel 4. In the drawings presented herein, the incoupling and outcoupling ports are assumed to be located at the respective emitters 2 and sensors 3.

Figure 1B:
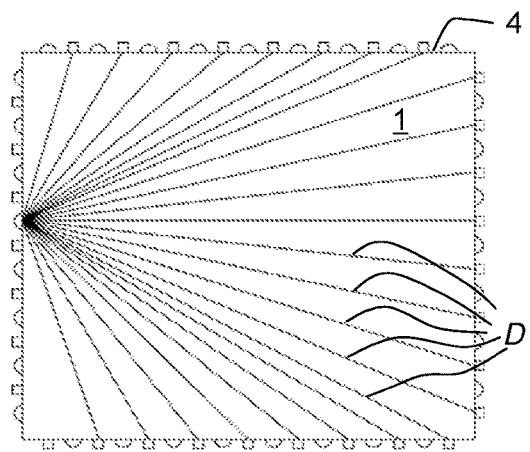
Figure 1C:
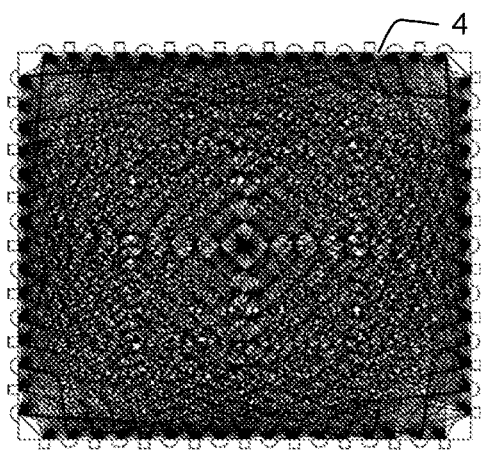

FIGS. 1B-1C give an example of an arrangement of emitters (represented by semicircles) and sensors (represented by squares) around a rectangular touch surface 1. In the top plan view of FIG. 1B, one of the emitters (mid-left) is activated to generate the signal as a beam or wave that diverges in the plane of the touch surface 1. The signal is received and detected by a group of sensors disposed along the perimeter of the touch surface 1, thereby forming a plurality of detection lines D across the touch surface 1. FIG. 1C illustrates the total ensemble of detection lines D that are formed when all emitters have been activated. Thus, in this example, a dense grid of detection lines is defined on the touch surface 1.

Reverting to the example in FIG. 1A, a signal processor 10 is electrically connected to the arrangement of sensors 3 (one shown) to receive and process an output signal from the arrangement. The output signal may, but need not, comprise one sub-signal from each sensor 3 in the apparatus 100. The signal processor 10 is configured to acquire one observed value for each detection line D from the output signal, where the observed value is generated as a function of the received energy (or an equivalent parameter, such as power or intensity) for the detection line D. The signal processor 10 is further configured to process the observed values by tomographic reconstruction to recreate a two-dimensional representation (an "image") of the distribution of an interaction-related parameter on the touch surface 1 (for simplicity, referred to as "interaction pattern" in the following). The interaction pattern, which represents the local interaction with the signals that propagate across the touch surface 1, may be further processed by the signal processor 10 or by a separate device (not shown) for touch determination, which may involve extraction of touch data, such as a position (e.g. x, y coordinates), a shape or an area of each touching object.

In the example of FIG. 1A, the apparatus 100 also includes a controller 12 which is connected to selectively control the activation of the emitters 2 (one shown) and, possibly, the readout of data from the sensors 3. The signal processor 10 and the controller 12 may be configured as separate units (as shown), or they may be incorporated in a single unit. As indicated, the signal processor 10 may include a processing unit 13 that operates in association with an electronic memory 14.

From the point of view of tomographic reconstruction, the touch surface 1 has ideally a circular shape. However, for practical reasons, the touch surface 1 is typically non-circular, e.g. rectangular as shown. For example, the shape of the touch surface 1 may be given by consideration of cost, ease of manufacture and installation, design, form factor, etc. Furthermore, if the apparatus 100 is overlaid on or integrated in a rectangular display device, the touch surface 1 is likely to also be designed with a rectangular shape. As will be described in further detail below, the tomographic reconstruction may be optimized for the non-circular shape of the touch surface 1 to improve the accuracy of the interaction pattern.

The apparatus 100 may be configured to permit transmission of energy in one of many different forms. The emitted signals may thus be any radiation or wave energy that can travel in the panel 4 and across the touch surface 1 including, without limitation, light waves in the visible or infrared or ultraviolet spectral regions, electrical energy, electromagnetic or magnetic energy, or sonic and ultrasonic energy or vibration energy.

Figure 2:
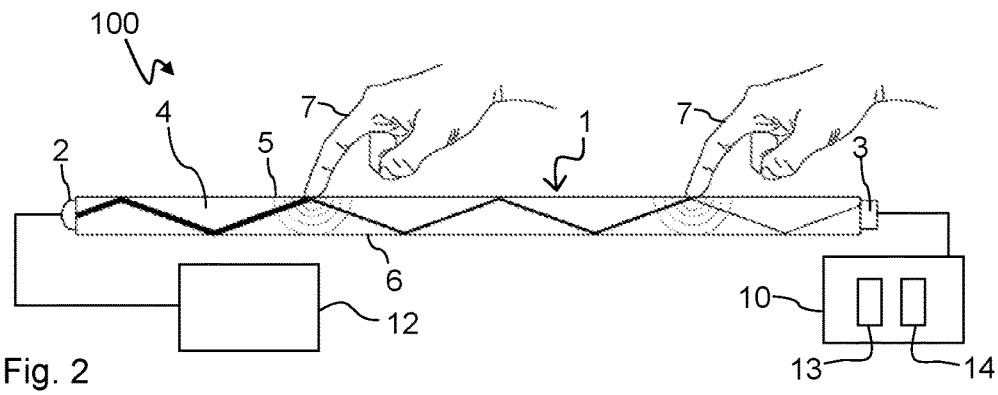
FIG. 2 is a side view of a touch-sensitive apparatus operating by total internal reflection of light.

Embodiments of the invention may, e.g., be applied in an apparatus 100 that operates by frustrated total internal reflection (FTIR), as described in the Background section. FIG. 2 is a schematic side view of such an apparatus 100, which includes a panel or slab 4 which is light transmissive and forms a planar (two-dimensional) light guide. The panel 4 comprises opposing surfaces 5, 6 which define a respective boundary surface of the panel 4. FIG. 2 shows a light emitter 2 and a light detector (sensor) 3, which are optically coupled to the panel 4 such that light emitted by the light emitter 2 is captured inside the panel 4 and propagates to the light detector 3 by internal reflections. The light is reflected in the top surface 5, which defines the touch surface 1, by total internal reflection (TIR). Thereby, when an object 7 touches the top surface 5, the total internal reflection is disrupted, or "frustrated", and the energy of the transmitted light is decreased, as indicated by the thinned lines to the right of the object 7. This phenomenon is commonly denoted FTIR (Frustrated Total Internal Reflection) and a corresponding touch-sensing apparatus is referred to as an "FTIR system". It is to be understood that the apparatus 100 comprises many light emitters 2 and many light detectors 3 that are coupled to the panel 4 such that incoupling and outcoupling ports are formed along the perimeter of the touch surface 1. It is also to be understood that the light from each light emitter 2 is captured in the panel 4 so as to propagate from the light emitter 2 to a plurality of light detectors 3 (cf. FIGS. 1B-1C). Thus, the panel 4 defines a plurality of light propagation paths from each light emitter 2 to a plurality of light detectors 3. Each of the light propagation paths, as projected onto the touch surface 1, forms a detection line D.

Figure 3A:
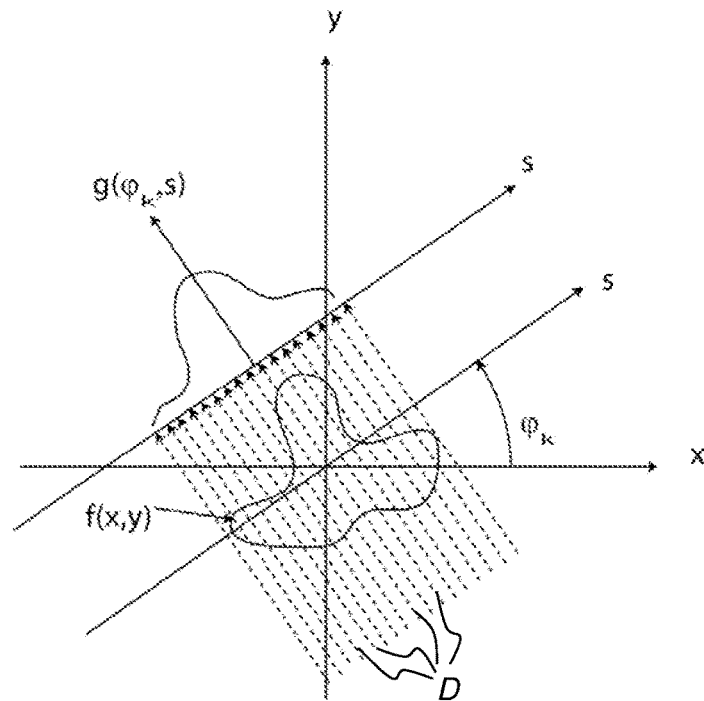
FIG. 3A illustrates a measurement system used in conventional tomography.

The signal processor 10 implements a tomographic reconstruction algorithm that generates the interaction pattern. Tomographic reconstruction algorithms are well-known in the art and are designed to process observed values which are generated in projection measurements through an attenuating medium. Each observed value is acquired for a specific propagation path (detection line) through the attenuating medium. In conventional tomography, e.g. as used in the field of medical imaging, the measurement system is controlled or set to yield a desired geometric arrangement of the detection lines. Such a measurement system is exemplified in FIG. 3A. The measurement system is configured to perform projection measurements through the attenuating medium f(x, y) by acquiring observed values for a given set of parallel detection lines at a plurality of angles, as exemplified at angle $\varphi_k$ in FIG. 3A. In FIG. 3A, the set of detection lines D are indicated by dashed arrows, and each detection line D has a unique minimum distance s to the origin of the x, y coordinate system. It is realized that the location of each detection line D in the x, y coordinate system is uniquely identified by the values of an angle parameter $\varphi$ and a distance parameter s. In FIG. 3A, the resulting collection of observed values acquired at angle $\varphi_k$ is represented by the function $g(\varphi_k, s)$. When the observed values have been acquired at angle $\varphi_k$, the measurement system is rotated slightly around the origin, to acquire observed values for a new set of parallel detection lines at this new rotation angle.

Figure 3B:
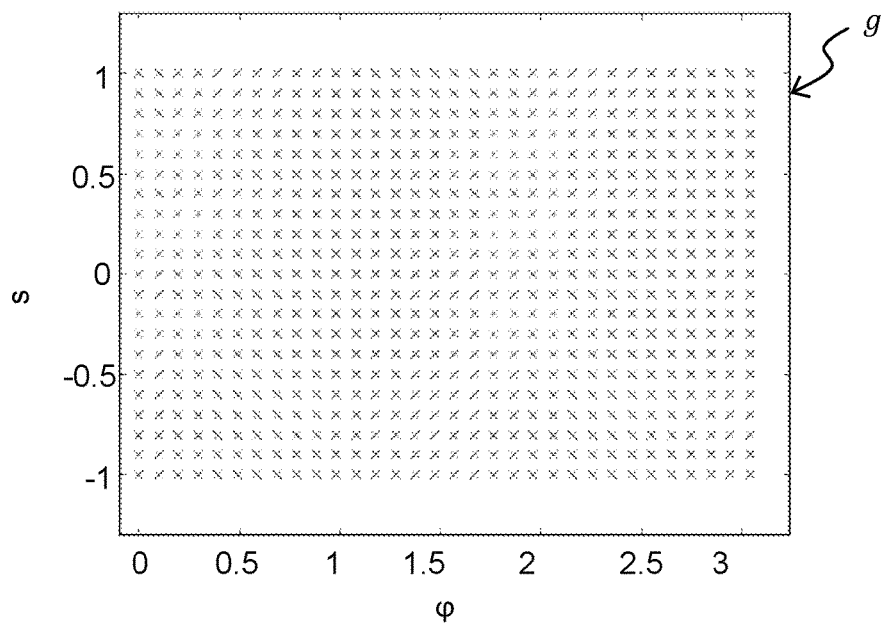
FIG. 3B is a sinogram obtain by the measurement system in FIG. 3A.

The projection measurements define a set of unique sampling points, where each sampling point corresponds to a detection line D and is associated with the observed value for this detection line. In tomographic processing, the observed values are represented in the form of a "sinogram", which is a function that maps the observed values to the sampling points. The sinogram is given in a two-dimensional (2D) sample space, which is defined by dimensions that uniquely identify each individual detection line D (sampling point). In the foregoing example, the sample space may be defined by the above-mentioned angle and distance parameters $\varphi$, s. Thus, the sinogram may be represented as a function $g(\varphi, s)$, abbreviated as g. FIG. 3B illustrates the sinogram g that is obtained for the measurement system in FIG. 3A, where every cross is a sampling point that corresponds to a detection line and is associated with an observed value. As seen, the sampling points are arranged in columns in the sample space, where each column corresponds to a projection measurement at a particular rotation angle (cf. $g(\varphi_k, s)$ in FIG. 3A). In the illustrated example, the observed values are sampled with equal spacing in the angle and distance parameters $\varphi$, s.

Tomographic reconstruction algorithms are designed to process the original sinogram $g(\varphi, s)$ so as to generate a representation of the attenuating medium f(x, y). Generally, tomographic reconstruction algorithms require the sampling points to be arranged in columns in the sample space, e.g. as shown in FIG. 3B. Further details about this requirement and tomographic techniques in general are found in aforesaid WO2011/139213, which is incorporated herein in its entirety.

One difficulty of applying tomographic reconstruction algorithms to observed values that are acquired in a touch-sensitive apparatus 100 of projection-type, is that the detection lines D generally do not conform to the parallel geometry described in relation to FIGS. 3A-3B, and thus the sampling points are not arranged in columns for different values of the $\varphi$ parameter. The detection lines D are given by the fixed placement of the emitters 2 and the sensors 3 along the perimeter of the touch surface 1. If the perimeter of the touch surface 1 is non-circular, e.g. rectangular, it is generally difficult or even impossible to design the apparatus 100 with detection lines D that conform to a parallel geometry.

Figure 4A:
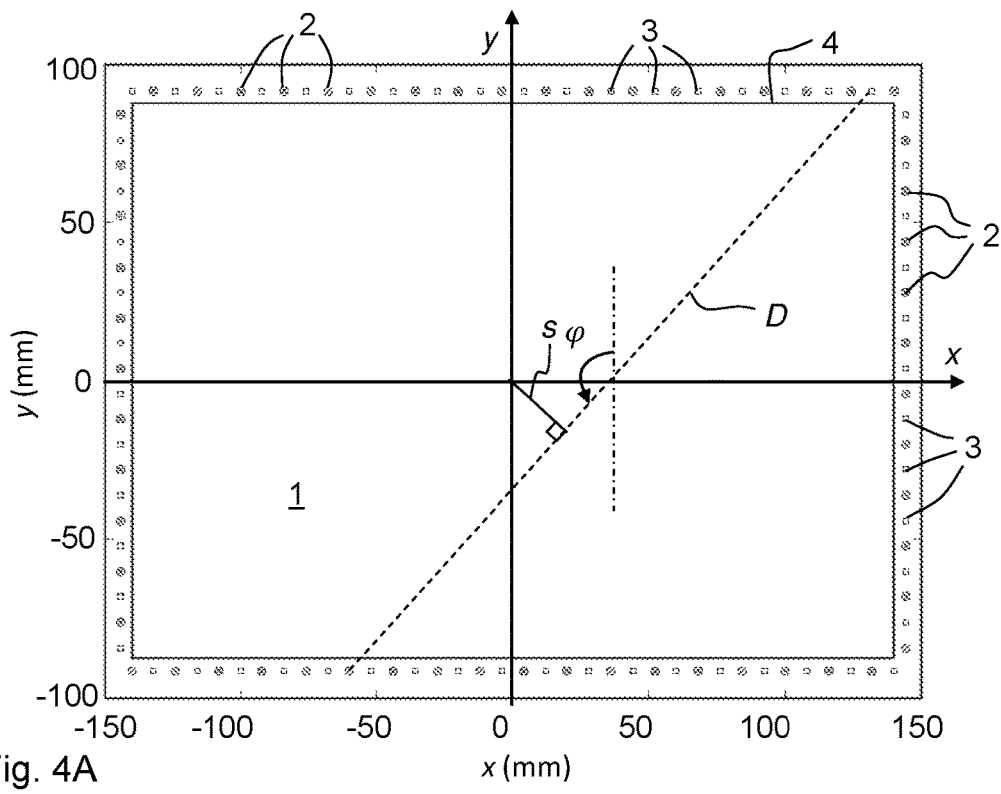
FIGS. 4A-4B are top plan views of two arrangements of emitters and sensors in a touch-sensitive apparatus.
Figure 4B:
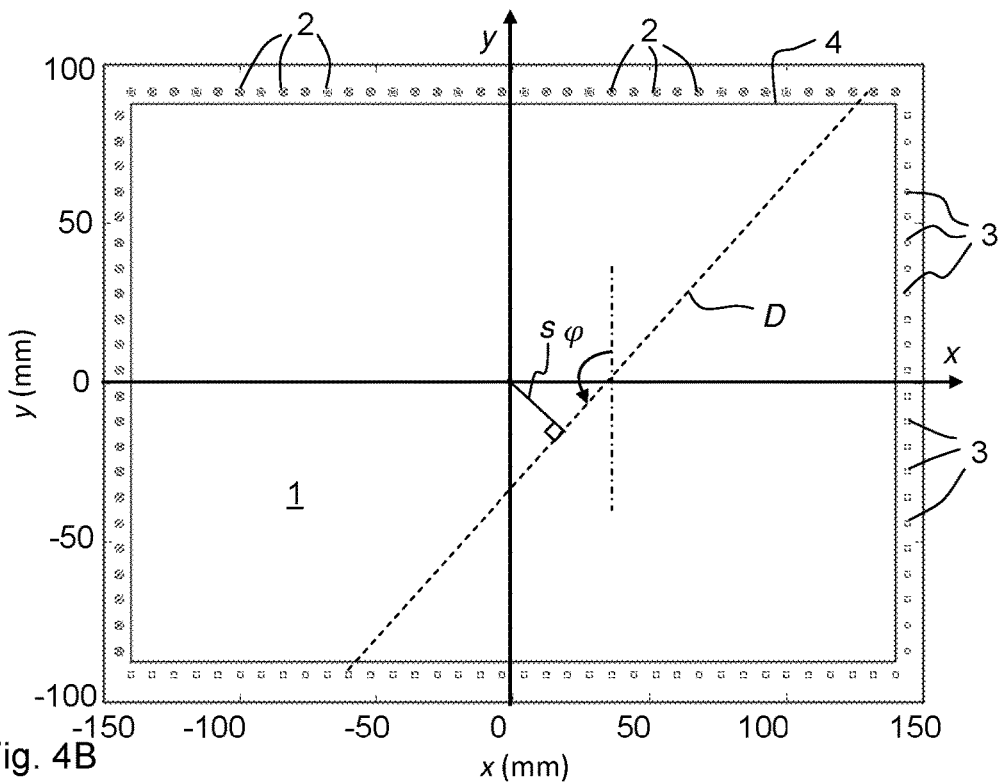

Embodiments of the invention that address this problem will now be described in relation to a touch-sensitive apparatus 100 with a rectangular touch surface 1. The description will focus on two exemplifying arrangements of emitters 2 (represented as crossed circles) and sensors 3 (represented as open squares) around the perimeter of the touch surface 1. A first arrangement, shown in FIG. 4A, is denoted "interleaved arrangement" and has emitters 2 and sensors 3 placed one after the other along the perimeter of the touch surface 1. Thus, every emitter 2 is placed between two sensors 3. The distance between neighboring emitters 2 and sensors 3 is the same along the perimeter. A second main arrangement, shown in FIG. 4B, is denoted "non-interleaved arrangement" and has merely sensors 3 on two adjacent sides (i.e. sides connected via a corner), and merely emitters 2 on its other sides. The distance between neighboring emitters 2 and between neighboring sensors 3, respectively, is the same along the perimeter.

The following description assumes that the x, y coordinate system is located with its origin at the center of the touch surface 1, and that the detection lines D are parameterized by an angle parameter $\varphi$ and a distance parameter s. This parameterization is illustrated for a single detection line D in FIGS. 4A-4B. As shown, the angle parameter $\varphi$ is the angle of the detection line D in the counter-clockwise direction from the y axis, and the distance parameter s is the perpendicular distance from the detection line D to the origin of the x, y coordinate system.

Figure 5A:
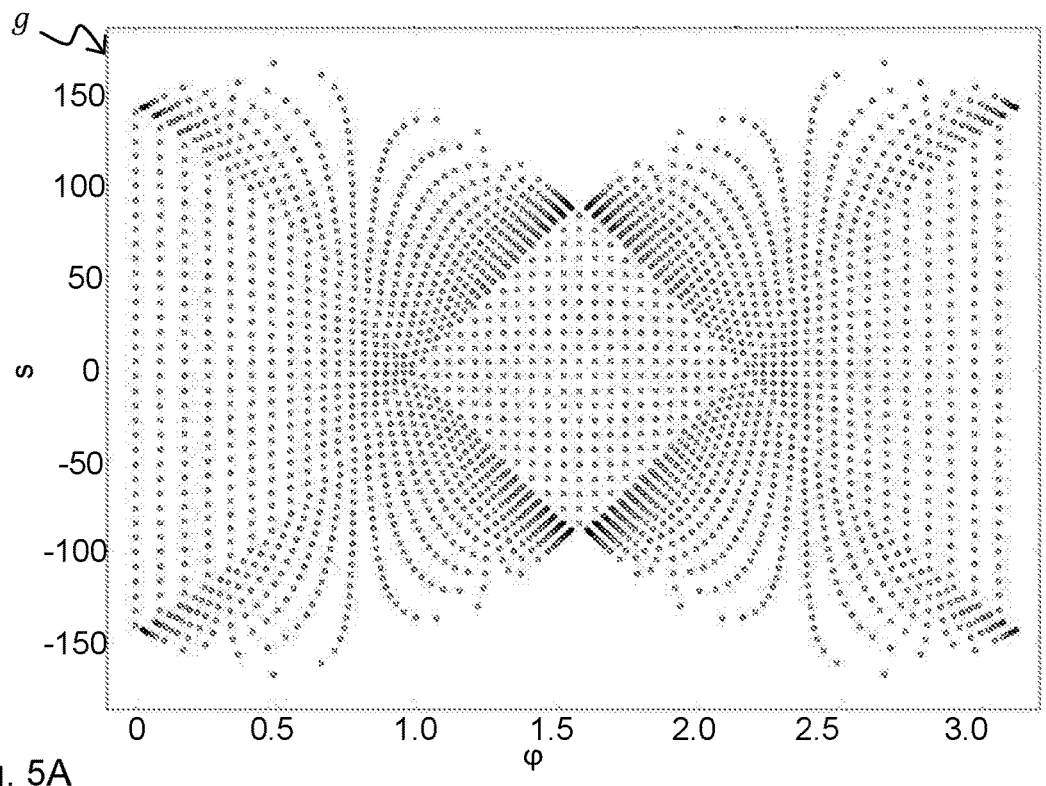
FIG. 5A is an original sinogram obtained for the apparatus in FIG. 4A.
Figure 5B:
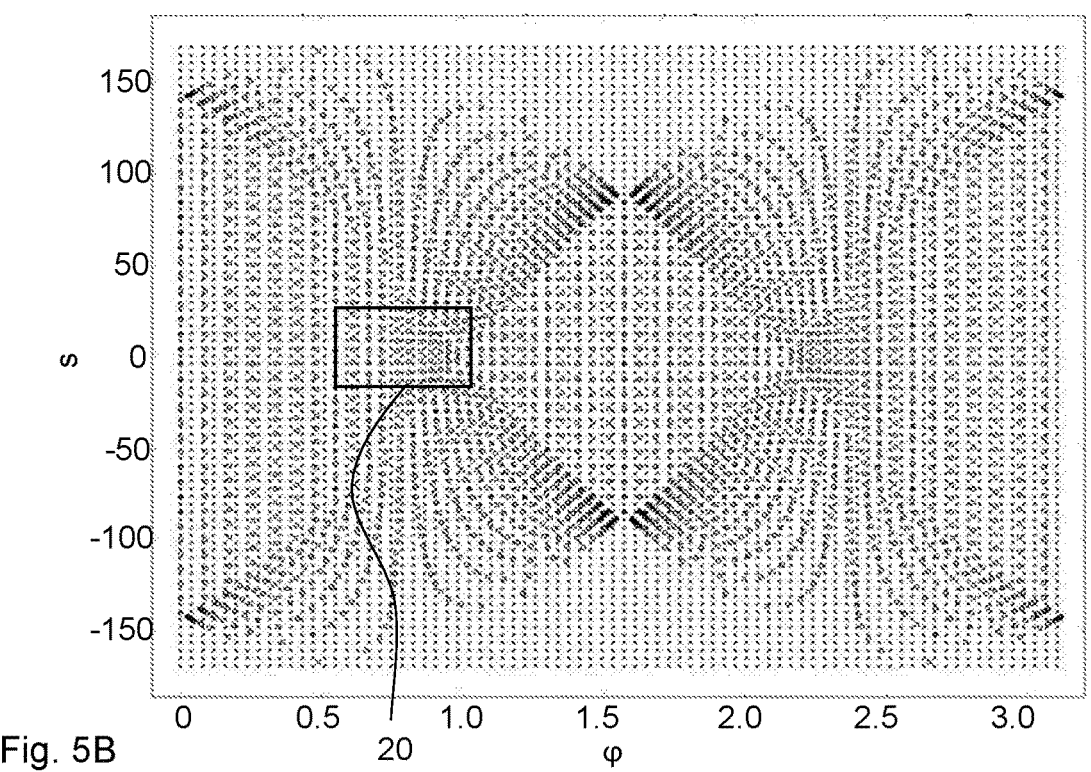
FIG. 5B illustrates interpolation points generated for the original sinogram in FIG. 5A according to the prior art.
Figure 5C:
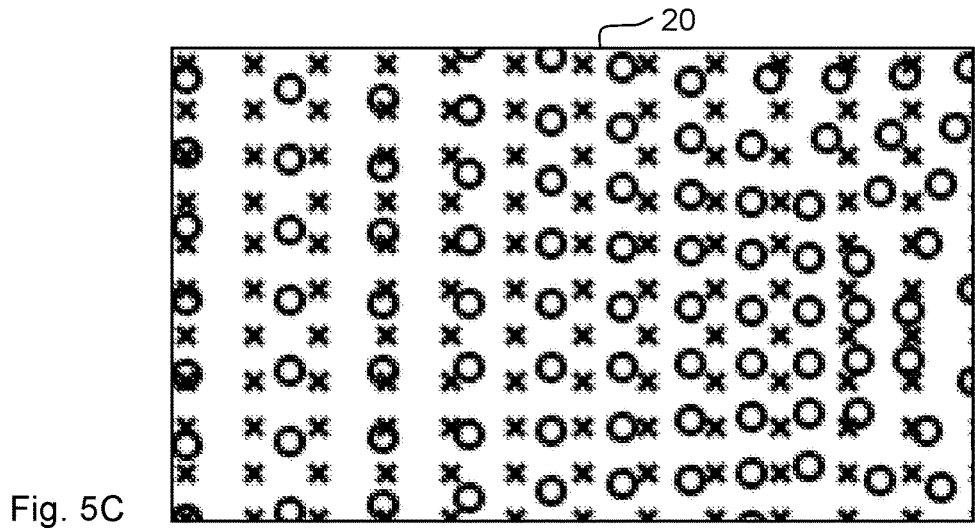
FIG. 5C is an enlarged view of FIG. 5B.

FIG. 5A illustrates, in the $\varphi$-s-plane ("sample space"), the sampling points (open circles) that are defined by the detection lines D in the interleaved arrangement of FIG. 4A. Thus, FIG. 5A represents an "original sinogram" g. As seen, the sampling points do not line up in columns in the φ-s-plane. To overcome this problem, aforesaid WO2011/139213 proposes to generate, by interpolation among the observed values for the sampling points, estimated (interpolated) values for interpolation points that are lined up in columns in the φ-s-plane. Thus, making the interpolation corresponds to estimating the observed values for fictitious detection lines with a desired location on the touch surface, e.g. a location that matches the parallel geometry as shown in FIG. 3A. FIG. 5B shows the sampling points (open circles) together with the interpolation points (crosses) that are generated in accordance with the example given in FIG. 14B in WO2011/139213, where the interpolation points are arranged with equal spacing within each column and with equal spacing between the columns. FIG. 5C is an enlarged view of the sampling points and the interpolation points within a marked box 20 in FIG. 5B. As used herein, an interpolated sinogram with interpolation points that are lined up in columns is denoted a "matched sinogram".

The present Applicant has found that an apparatus 100 that generates the matched sinogram according to the teachings in WO2011/139213, as exemplified in FIGS. 5B-5C, may exhibit a reduced spatial resolution, especially near the perimeter of the touch surface 1. The spatial resolution may be expressed as a "point separation", i.e. the minimum spacing between objects on the touch surface 1 that allows the apparatus 100 to separately identify the objects in the interaction pattern. After significant experimentation and testing, the present Applicant has found that the reduced spatial resolution may be at least partly attributed to the fact that the estimated values for the interpolation points are generated by interpolation with respect to the φ direction among the observed values for the sampling points. This insight will be further explained in relation to FIGS. 6A-6B and FIGS. 7A-7B.

First, it should be stated that the use of interpolation inevitably introduces errors into the interaction pattern, since the interpolation operates to estimate the observed values of fictitious detection lines on the touch surface 1, and an estimate is inherently associated with some degree of uncertainty. Reverting to FIG. 5C, it is seen that most of the interpolation points (crosses) are significantly displaced in both the φ direction and the s direction with respect to the sampling points (circles). The interpolation is implemented to generate an interpolated value for a fictitious detection line (interpolation point) by combining, using some kind of weight factors, the observed values of two or more detection lines that have a similar extent as the fictitious detection line on the touch surface (i.e. sampling points located in the neighborhood of the interpolation point in the φ-s-plane). The weight factors depend on the distance between the sampling points and the interpolation point in the φ-s-plane. The present Applicant has realized that the distance in the φ-s-plane does not correspond to a given spacing between detection lines on the touch surface, and that this causes the interpolated values to be less accurate with increasing contribution from detection lines with different angles on the touch surface.

Figure 6A:
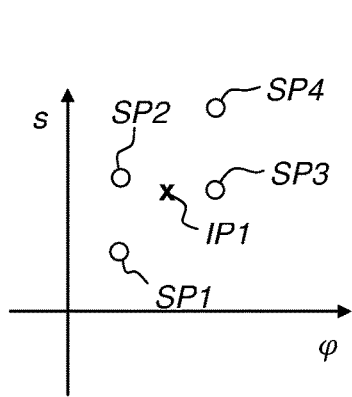
FIGS. 6-7 illustrate how an interpolation point is generated according to the prior art and according to an embodiment of the invention, respectively.
Figure 6B:
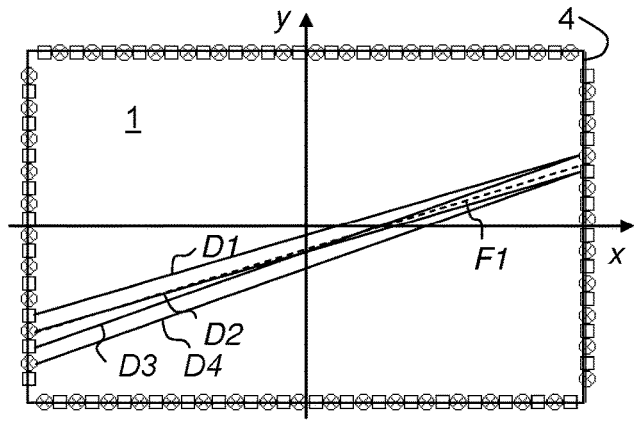

FIG. 6A is a schematic illustration of four sampling points SP1-SP4 (circles) and one interpolation point IP1 (cross) in the φ-s-plane, and FIG. 6B shows the detection lines D1-D4 (full lines) that correspond to the sampling points SP1-SP4, and the fictitious detection line F1 (dashed line) that corresponds to the interpolation point IP1. It is assumed that the interpolated value at the interpolation point IP1 is generated as a combination of the observed values of the sampling points SP1-SP4, weighted as a function of the distances between the respective sampling point SP1-SP4 and the interpolation point IP1 (denoted "interpolation distances" herein). In the illustrated example, the interpolated value for the fictitious detection line F1 may contain approximately equal contributions from the observed values of the detection lines D1-D4. By looking at FIG. 6B, it is realized that the interpolated value represents a combination of the interaction within the surface portion spanned by the detection lines D1-D4. As seen, distances between the fictitious detection line F1 and the detection lines D1-D4 differ along the fictitious detection line F1 on the touch surface 1, and the largest differences are found at the lower left-end part of the touch surface 1, i.e. at its perimeter. This means that interaction that occurs in the lower left-end part of the touch surface 1 will be less accurately represented in the interpolated value than interaction that occurs among the detection lines D1-D4 closer to the center of the touch surface 1. It is realized that if too many interpolated values are generated by interpolation in both the φ direction and the s direction, this will have a negative impact on the spatial resolution of the interaction pattern, in particular at the perimeter of the touch surface 1.

Figure 7A:
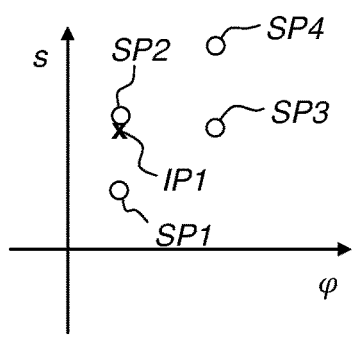
Figure 7B:
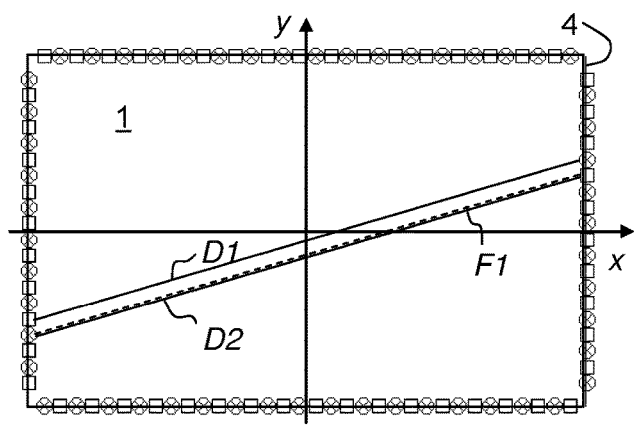

FIGS. 7A-7B illustrate a principle applied in embodiments of the invention to improve the spatial resolution at the perimeter of the touch surface 1. The principle involves locating the columns of interpolation points with respect to the sampling points so as to avoid excessive interpolation in the φ direction. This may be achieved by ensuring that the columns of interpolation points (also denoted "matched sampling points" herein) in the matched sinogram coincide with existing columns of sampling points in the original sinogram. In FIG. 7A, the interpolation point IP1 is shifted in the φ direction compared to FIG. 6A, so as to be aligned with the column containing the sampling points SP1 and SP2. Assuming that the interpolated value at the interpolation point IP1 is generated as a function of the observed values of the sampling points SP1-SP4, based on interpolation distances in the same way as in FIG. 6A, it is realized that the contribution from the sampling points SP3 and SP4 (i.e. detection lines D3 and D4) is reduced compared to FIG. 6A. This corresponds to an improved spatial resolution at the perimeter of the touch surface 1.

Thus, to improve the spatial resolution, the interpolation points may be arranged in non-equidistant columns in the matched sinogram, such that the respective column of interpolation points in the matched sinogram coincides with a column of sampling points in the original sinogram. This means that the interpolation points are aligned with existing "alignment lines" in the original sinogram, where the respective alignment line extends through at least two sampling points. With reference to FIG. 7A, the sampling points SP1 and SP2 define one alignment line, and the sampling points SP3 and SP4 may define another alignment line.

In a special implementation, the interpolation is selectively modified to only perform an interpolation in the s direction for those interpolation points that are aligned with a column of sampling points and are located between sampling points in this column. In FIG. 7A, this would mean that the interpolated value for the interpolation point IP1 is generated as a weighted combination of the observed values at the sampling points SP1 and SP2. Thereby, the interpolated value for the fictitious detection line F1 only contains contributions from the observed values for the detection lines D1 and D2, as shown in FIG. 7B. This will further improve the spatial resolution at the perimeter of the touch surface 1.

It should be understood that the foregoing discussion with reference to FIGS. 6-7 is merely given to facilitate the understanding of the embodiments to be described in the following. In particular, the foregoing discussion is not intended to imply that the interpolation should operate only on sampling points in the neighborhood of the respective interpolation point, that the interpolation is to be based on a specific number of sampling points, or that a specific interpolation function should be applied. The interpolation function may e.g. be any of the functions discussed in aforesaid WO2011/139213, such as a function based on Delaunay triangulation, weighted average interpolation or Fourier transformation. With respect to weighted average interpolation, it should be noted that the weights need not be calculated based on Euclidian distances in the $\varphi$-s-plane, but could be given by the distance in the $\varphi$ and s dimensions separately. Such weight functions are further exemplified in WO2011/139213.

Figure 8A:
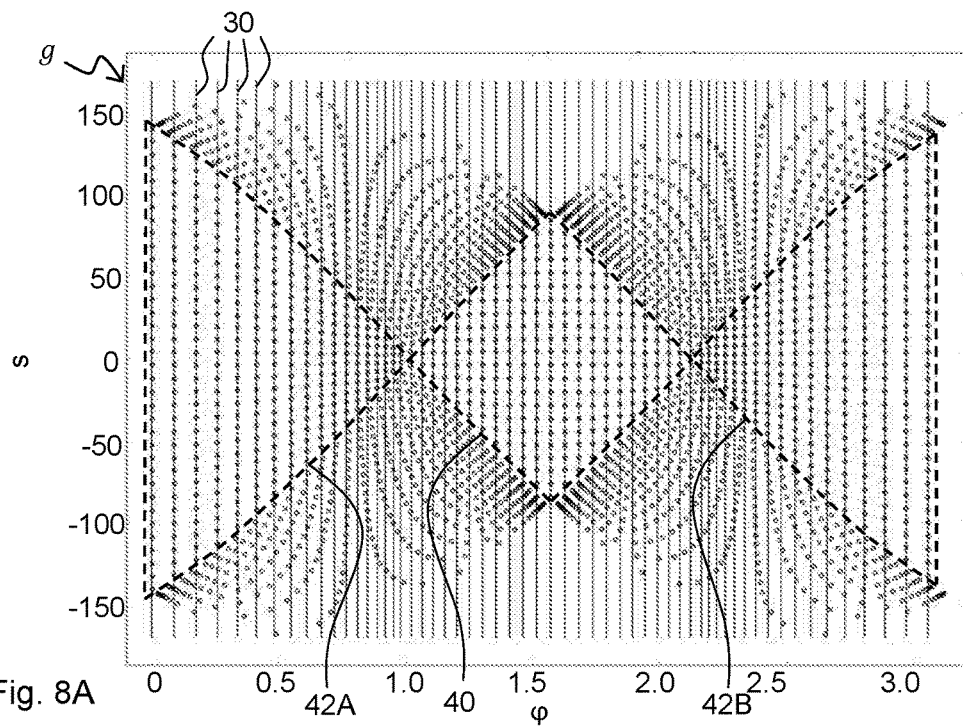
FIG. 8A highlights structures in the original sinogram of FIG. 5A.

The foregoing principles will now be exemplified with respect to the original sinogram g in FIG. 5A. Although it is certainly possible to define alignment lines for each and every sampling point which is aligned with at least one other sampling point in the s direction (i.e. that have the same value of the angle parameter $\varphi$), this may lead to an excessive amount of alignment lines, and thus to an excessive amount of interpolation points. Using an excessive number of interpolation points will not increase the accuracy of the interaction pattern, but mainly increase the number of processing operations and the required storage capacity of the electronic memory. This potential drawback is obviated by defining the alignment lines based on sampling points that are located within selected sub-portions of the original sinogram g, i.e. sampling points that have selected values of the $\varphi$ and s parameters. FIG. 8A reproduces FIG. 5A with vertical alignment lines 30 that are given by the sampling points within three distinct sub-portions 40, 42A, 42B in the original sinogram g. All of these sub-portions include sampling points that correspond to detection lines which extend between opposite sides of the rectangular touch surface 1. The sampling points within sub-portion 40 represent detection lines that extend between the opposite shorter sides of the touch surface 1, i.e. the left and right rows of emitters and sensors in FIG. 4A. The sampling points within sub-portion 42A represent a subset of the detection lines that extend between the opposite longer sides of the touch surface 1, i.e. the upper and lower rows of emitters and sensors in FIG. 4A, namely the detection lines that are exactly vertical and the detection lines that are angled to the left in FIG. 4A. The sampling points within sub-portion 42B represent another subset of the detection lines that extend between the opposite longer sides of the touch surface, namely the detection lines that are angled to the right in FIG. 4A. As seen in FIG. 8A, the sampling points within sub-portions 40, 42A, 42B line up in columns in the $\varphi$-s-plane, and these columns define the alignment lines 30. The sampling points that are located outside the sub-portions 40, 42A, 42B represent detection lines that extend between adjacent sides of the touch surface, and these detection lines are highly mismatched to a parallel geometry.

It should be noted that the alignment lines 30 are non-equispaced, i.e. the spacing between consecutive alignment lines 30 varies within the original sinogram g.

Figure 8B:
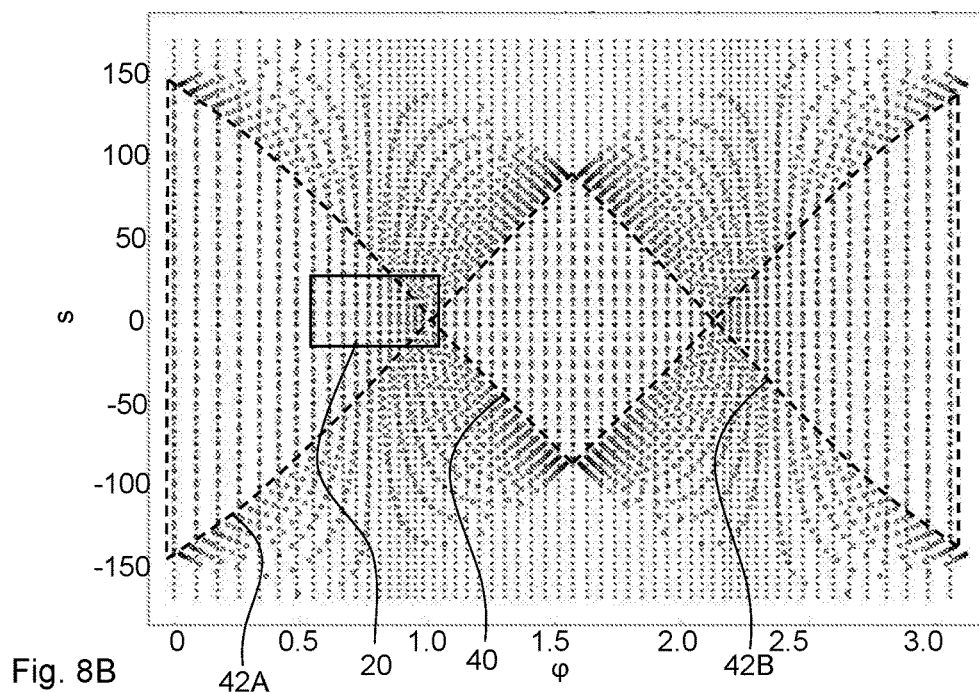
FIG. 8B illustrates interpolation points generated for the original sinogram in FIG. 5A using the structures in FIG. 8A.
Figure 8C:
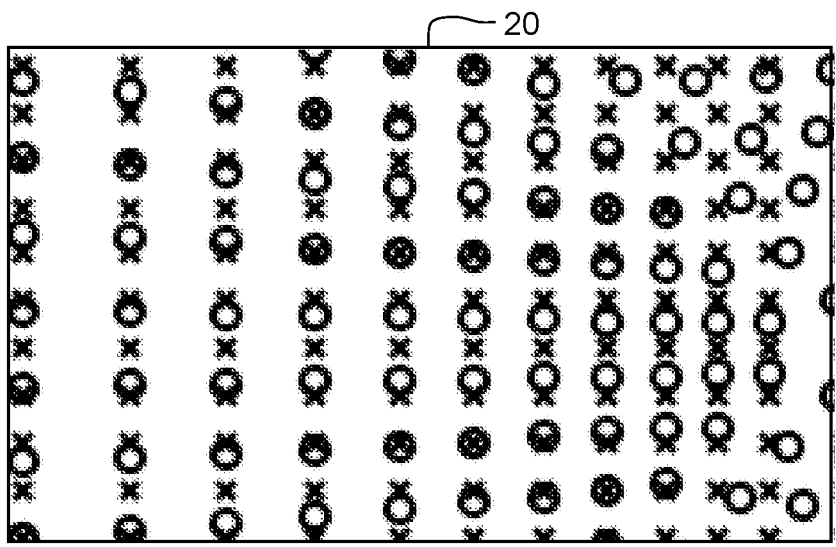
FIG. 8C is an enlarged view of FIG. 8B.

The matched sinogram is generated by arranging the interpolation points on the non-equispaced alignment lines 30 and by calculating the interpolated values based on the observed values of the sampling points in the original sinogram g. FIG. 8B shows an example of such a matched sinogram as overlaid on the original sinogram (shown in FIG. 5A), and FIG. 8C is an enlarged view of the sampling points (circles) and interpolation points (crosses) within box 20 in FIG. 8B. As seen, the interpolation points are arranged in columns, which are defined by the sampling points in the sub-portions 40, 42A, 42B. In the illustrated example, the interpolation points are equally spaced within the respective column, and the spacing between the interpolation points is the same within all columns. The use of identical spacing between the interpolation points within all columns may simplify the subsequent tomographic reconstruction. In a variant, not shown, the interpolation points are equally spaced within the respective column, but the spacing between the interpolation points is different in different columns. The spacing between the interpolation points within the respective column may, e.g., be adapted to minimize the interpolation distances within the column. In a further variant, the spacing between interpolation points may even differ within each column.

As mentioned above, it may be beneficial to apply different types of interpolation when generating interpolation points in different portions of the $\varphi$-s-plane. Specifically, the interpolation points in the sub-portions 40, 42A, 42B may be generated by one-dimensional (1D) interpolation among the sampling points in the respective column, whereas interpolation points outside these sub-portions may be generated by two-dimensional (2D) interpolation in the $\varphi$-s-plane. The 1D interpolation thus operates to generate each interpolated value at an interpolation point on an alignment line 30 as a weighted combination of observed values for two or more sampling points on this alignment line. In contrast, the 2D interpolation operates to generate each interpolated value as a weighted combination of observed values for two or more sampling points that may be displaced in both the $\varphi$ direction and the s direction from the interpolation point.

Depending on implementation, one or more interpolation points (or even all interpolation points) within one or more of the sub-portions 40, 42A, 42B may coincide with a respective sampling point. Likewise, one or more interpolation points outside the sub-portions 40, 42A, 42B may coincide with a sampling point. For each interpolation point that coincides with a sampling point, the interpolated value may be directly set equal to the observed value for this sampling point. Alternatively, a given interpolation function may be applied to compute the interpolated values of all interpolation points, also the interpolation points that coincide with sampling points. The latter approach may be more computation efficient since it does not involve special treatment of certain interpolation points.

As seen in FIG. 8B, the matched sinogram may include interpolation points in large regions of the $\varphi$-s-plane where there are no sampling points. The estimated values of the interpolation points in these regions may be computed using the extrapolation techniques presented in WO2011/139213, or they may be set to a value that represents an absence of interaction.

It should be noted that it is a general property of a rectangular touch surface that the detection lines that extend between opposite sides exhibit a larger degree of parallelism than the detection lines that extend between adjacent sides. Thus, it is generally advantageous to define the alignment lines 30 based on the sampling points within the sub-portions 40, 42A, 42B. The same property is also found when the touch surface 1 has other shapes with opposite line portions that are parallel, such as other types of quadrilateral shapes, including squares, trapezoids and parallelograms, as well as other types of polygons, such as hexagons and octagons.

Figure 9A:
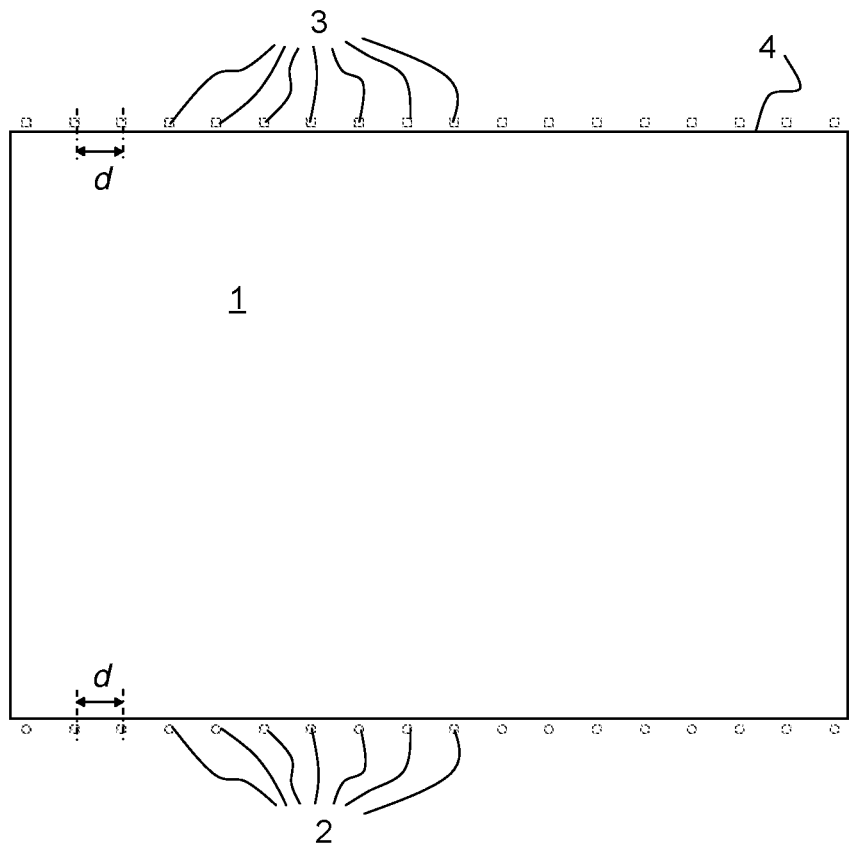
FIG. 9 illustrate an inventive use of detection lines that extend between opposite sides of the touch surface.
Figure 9B:
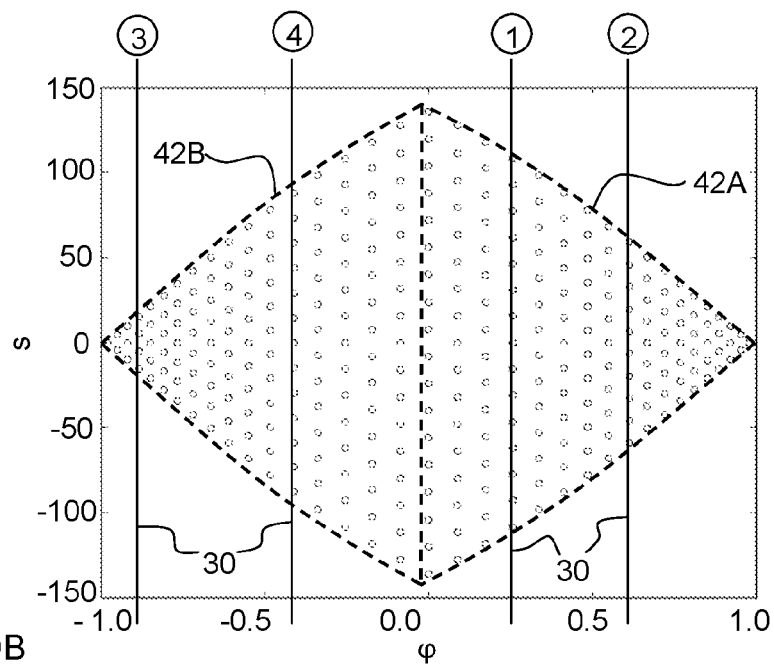
Figure 9C:
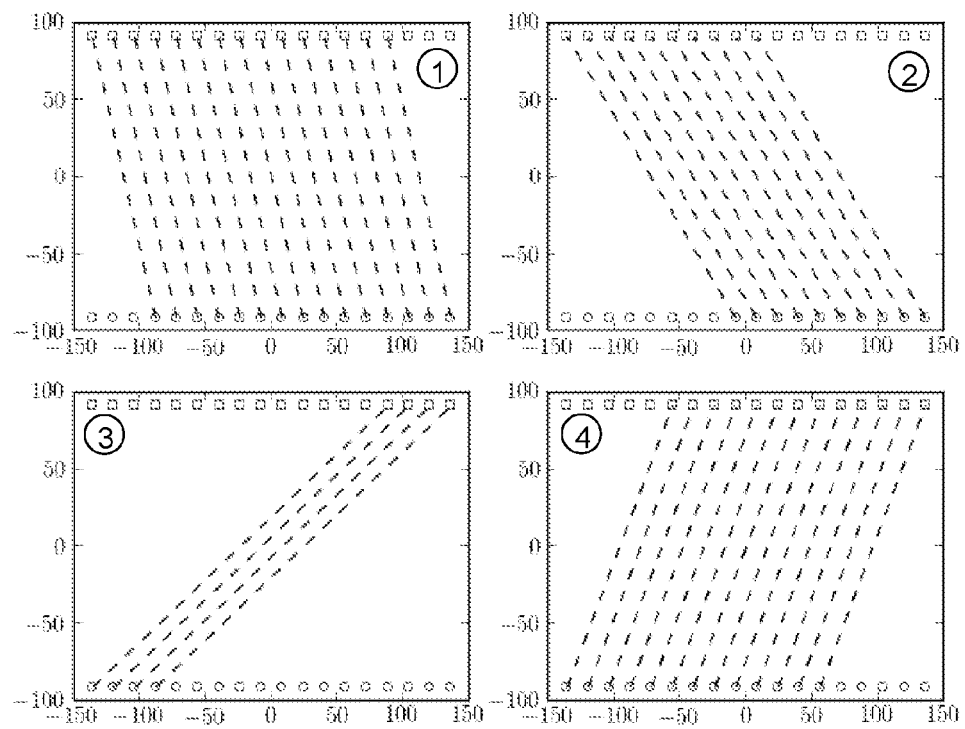

FIG. 9A serves to exemplify how parallel detection lines may be formed between electro-optical components on opposite sides of the touch surface. In the illustrated example, emitters 2 are disposed along one of the longer sides of the touch surface 1 and sensors 3 are disposed along the other longer side, and each emitter 2 on one side is arranged to transmit energy to all of the sensors 3 on the opposite side. The emitters 2 and sensors 3 are arranged with equal center-to-center spacing (d in FIG. 9A). The following discussion focuses on the formation of detection lines between the longer sides, and therefore emitters and sensors that are disposed along the shorter sides of the touch surface are omitted from FIG. 9A. Using the definition of $\varphi$ and s parameters according to FIG. 4, the detection lines that extend between the longer sides define sampling points that line up in columns in the $\varphi$-s-plane, as shown in FIG. 9B. It should be noted that the sampling points in FIG. 9B fall within the above-described sub-portions 42A and 42B. For the purpose of illustration, four alignment lines 30 are indicated in FIG. 9B and denoted by encircled numbers 1-4. The detection lines that correspond to the sampling points on the respective alignment line 30 in FIG. 9B are represented by dashed lines in FIG. 9C and are shown in four corresponding top plan views of the touch surface 1. As seen, an arrangement of equispaced electro-optical components along opposite sides results in groups of parallel detection lines, and each such group is represented by a column of sampling points in the $\varphi$-s-plane. It is also realized that if one or more of the emitters 2 or sensors 3 are removed in FIG. 9A, certain sampling points will disappear in FIG. 9B, but the remaining sampling points still line up in columns. Generally, the electro-optical components in FIG. 9A may be seen to be placed in accordance with a sequence of equispaced nominal positions (with nominal spacing d) along each of the opposite sides, and this sequence is associated with a set of known alignment lines in the $\varphi$-s-plane, namely all of the columns in FIG. 9B. Thus, as long as the location of each electro-optical component matches a nominal position, the sampling points will fall in the columns in FIG. 9B.

This means that the placement of emitters 2 and sensors 3 along the respective side of the touch surface 1 may deviate from the equispaced arrangement in FIG. 4A, while still achieving a sufficient degree of parallelism for the detection lines that extend between opposite sides. The parallelism may e.g. be achieved by the above-discussed use of equispaced nominal positions for the electro-optical components. This is equivalent to arranging the electro-optical components (emitters, sensors) on the opposite sides such that each component has a center-to-center distance (CC distance) to its adjacent component(s) which is equal to or a multiple of the minimum CC distance between adjacent components on the opposite sides.

Figure 10A:
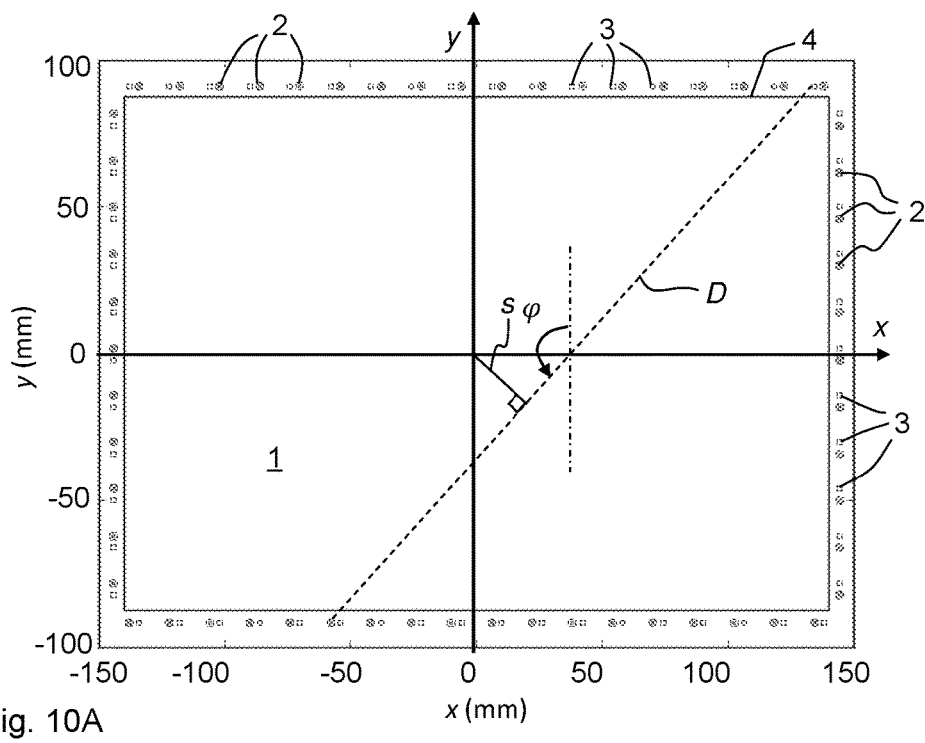
FIG. 10A illustrates a variant of the apparatus in FIG. 4A, and FIGS. 10B-10C are plots corresponding to FIGS. 8A-8B for the apparatus in FIG. 10A.
Figure 10B:
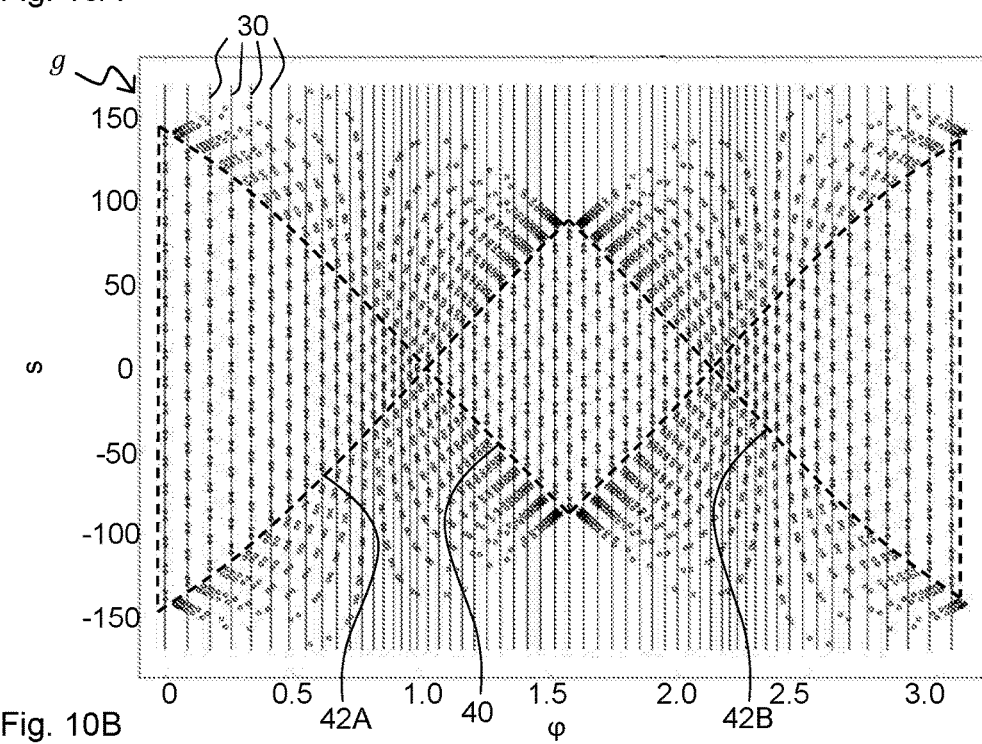
Figure 10C:
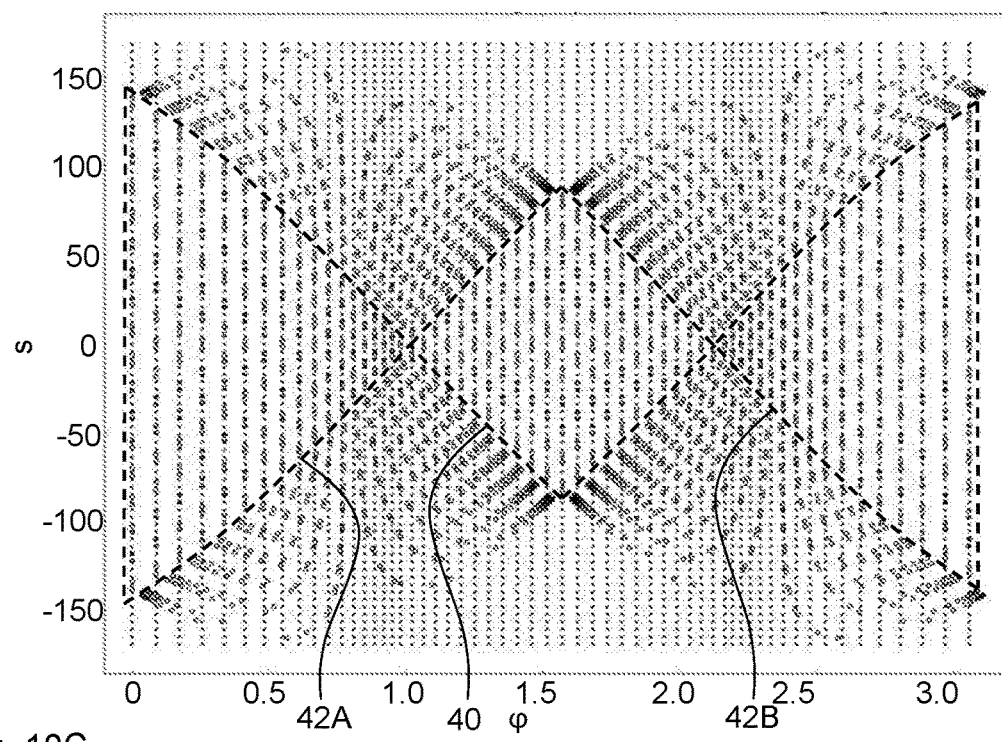

FIG. 10A illustrates a variant of the interleaved arrangement in FIG. 4A, in which the electro-optical components (emitters and sensors) are arranged with non-equal spacing along the perimeter of the touch surface 1. Specifically, the emitters 2 and sensors 3 are grouped in pairs, and the CC distance between the emitter 2 and sensor 3 in each group is equal to a given minimum CC distance. The CC distance between the groups (i.e. the emitter 2 in one group and the sensor 3 in the adjacent group) is three times the minimum CC distance. As seen in the original sinogram g in FIG. 10B, the detection lines that extend between the opposite sides define sampling points that line up in columns in the $\varphi$-s-plane (in sub-portions 40, 42A and 42B). However, the layout of the emitters 2 and sensors 3 in FIG. 10A leads to gaps in the resulting columns of sampling points, but these gaps are uniformly distributed within the sub-portions 40, 42A, 42B. FIG. 10B also shows vertical alignment lines 30 that may be defined based on the columns of sampling points within the sub-portions 40, 42A, 42B. FIG. 10C shows the sampling points (circles) in the original sinogram g together with the interpolation points (crosses) that may be defined on the alignment lines 30 in FIG. 10B.

Figure 11A:
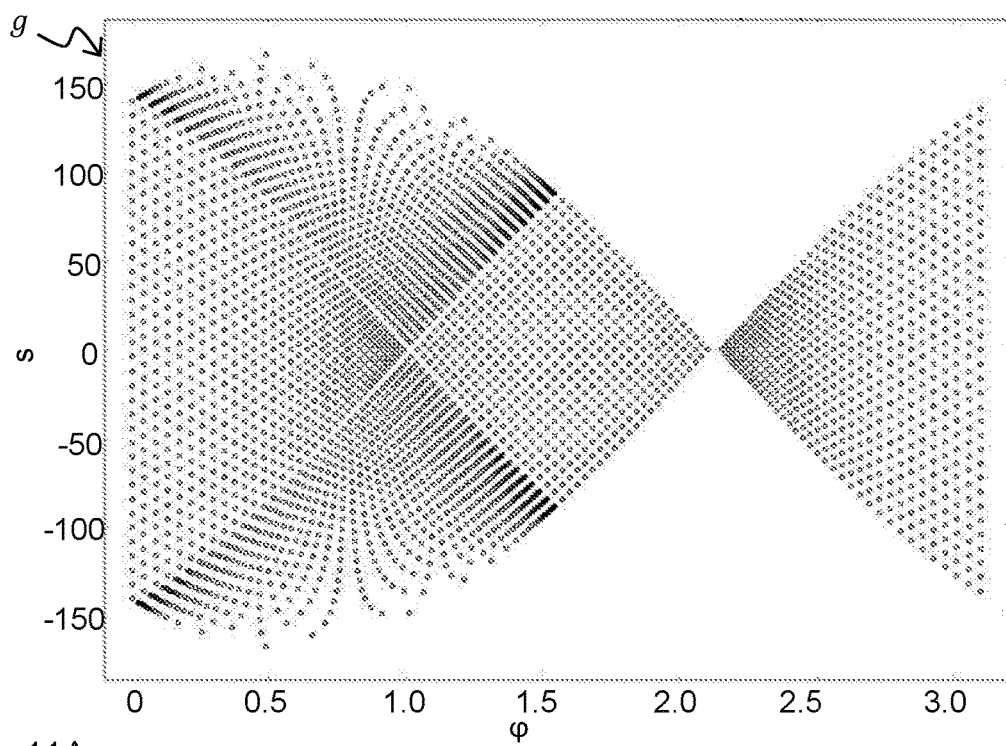
FIGS. 11A-11D are plots corresponding to FIG. 5A, FIG. 8A, FIG. 8B and FIG. 8C for the apparatus in FIG. 4B.
Figure 11B:
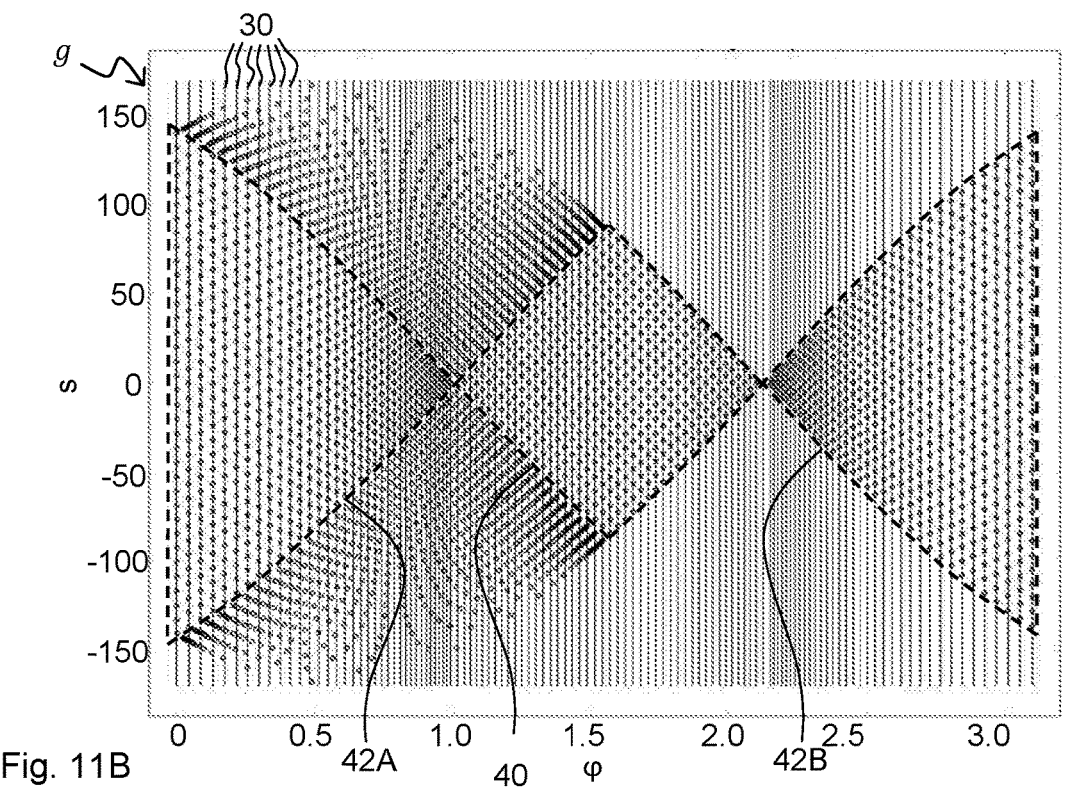
Figure 11C:
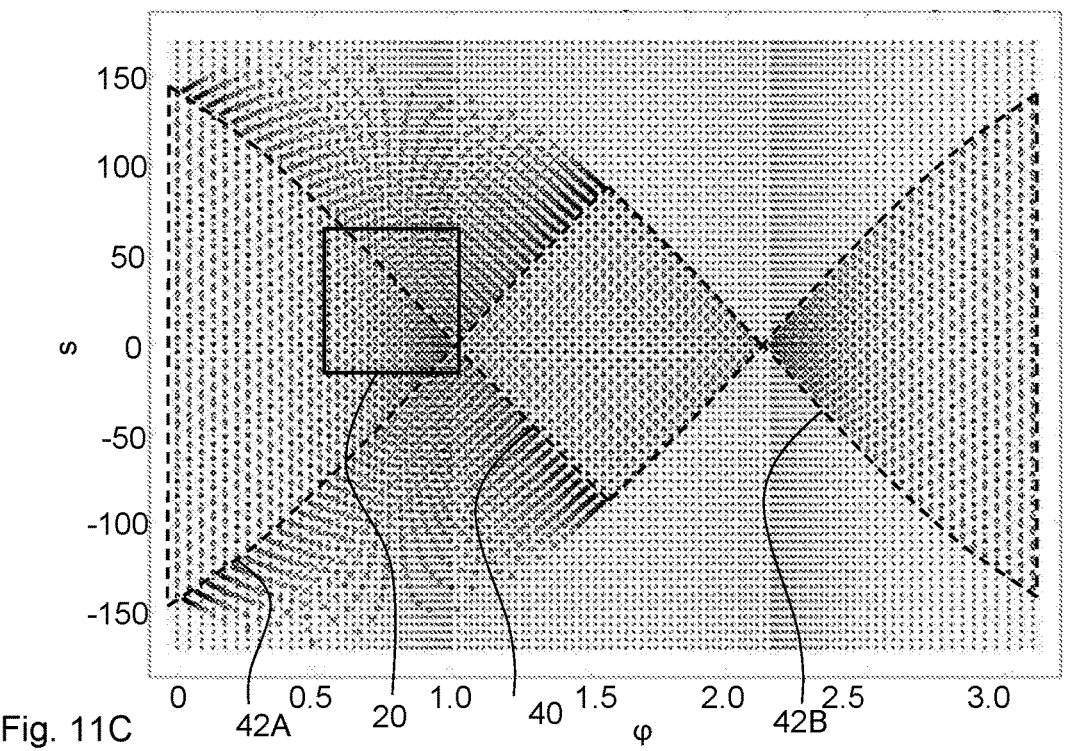
Figure 11D:
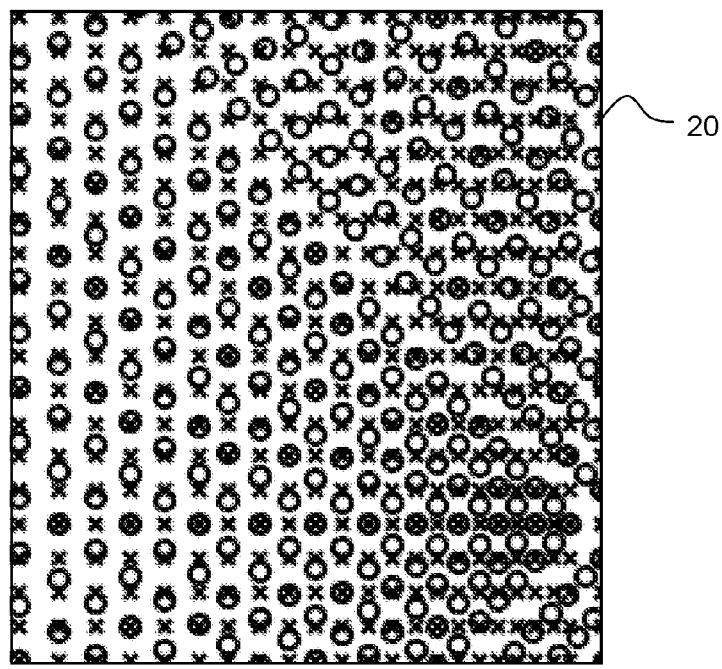

The foregoing discussion is applicable to all arrangements of emitters and sensors that define detection lines between both adjacent sides and opposite sides of the touch surface. FIG. 11A shows the original sinogram g for the non-interleaved arrangement in FIG. 4B. As shown in FIG. 11B, the sampling points within the sub-portions 40, 42A and 42B line up in columns, which are used for defining alignment lines 30. FIG. 11C shows the sampling points (circles) in the original sinogram g together with interpolation points (crosses) that are defined on the alignment lines 30 in FIG. 11B. FIG. 11D is an enlarged view of the sub-area 20 in FIG. 11C. As seen, the columns of interpolation points are aligned with the columns of sampling points in the sub-portions 40, 42A and 42B.

In all of the foregoing examples, the arrangement of emitters 2 and sensors 3 is selected such that all sampling points within sub-portions 40, 42A and 42B define distinct and perfect columns in the $\varphi$-s-plane. However, there may be design considerations that call for a different placement of the emitters 2 and sensors 3 such that the sampling points are less accurately aligned in the $\varphi$-s-plane, in one or more of the sub-portions 40, 42A and 42B. In such a situation, it may still be possible to select the alignment lines so as to extend through two or more samplings points that are aligned in the s direction (i.e. have the same angle $\varphi$). However, the number of alignment lines may become excessive or at least larger than necessary to achieve a certain reconstruction accuracy. As will be shown below, with reference to an example, this drawback can be overcome by defining the alignment lines to coincide with center points of a given number of clusters of sampling points that are identified by standard cluster analysis among the sampling points that are located within the one or more sub-portions 40, 42A and 42B. Cluster analysis is a statistical approach to grouping a set of objects into a number of disjoint sets, i.e. sets that have no member in common. All members in a grouped set are "similar" in some respect to each other. There are many known types of clustering algorithms that may be used in the cluster analysis, such as connectivity-based clustering, centroid-based clustering, distribution-based clustering and density-based clustering, all of which are well-known to the person skilled in the art.

Figure 12A:
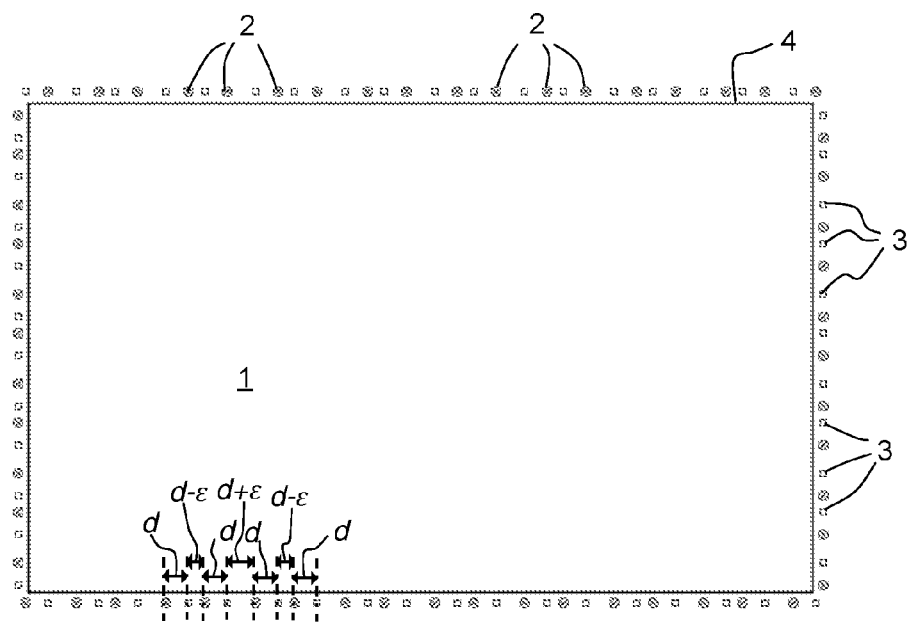
FIG. 12A illustrates a further variant of the apparatus in FIG. 4A.

FIG. 12A illustrates an interleaved arrangement of emitters 2 and sensors 3, where the CC distance between adjacent components follows a repeating cycle of [d, d+ε, d, d−ε], where d is the nominal distance and ε is a fraction of the nominal spacing. Thus, along each side of the touch surface 1, every second component is alternately displaced towards and away from one of its neighboring components.

Figure 12B:
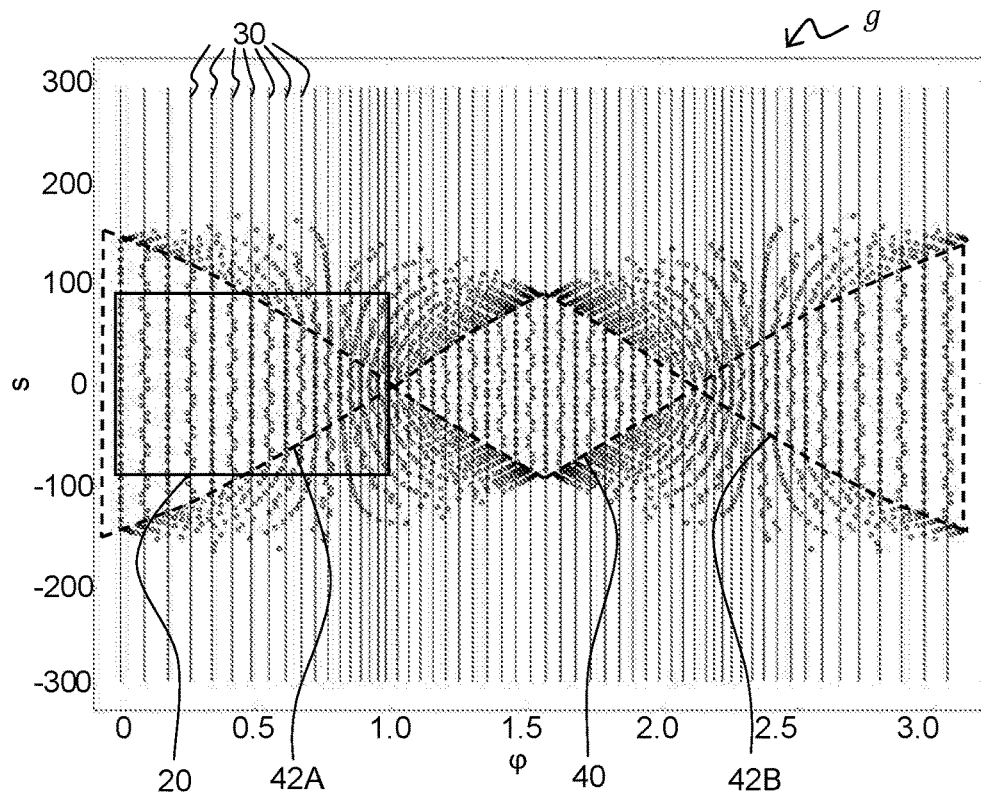
FIG. 12B is a plot corresponding to FIG. 8A.

FIG. 12B shows the resulting original sinogram together with alignment lines 30 which have been defined based on the sampling points in the sub-portions 40, 42A and 42B. As seen, in particular in the enlarged view in FIG. 12C, every second alignment line 30 does not extend through any sampling points, but is rather matched to a vertical cluster of sampling points, also denoted a "columnated cluster" or a "φ-direction cluster" herein. As understood from the foregoing discussion with reference to FIG. 9, each columnated cluster corresponds to detection lines that have similar angles on the touch surface 1. In the particular example in FIG. 12B, the sampling points in sub-portion 42A, shown in FIG. 12C, have been processed for identification of 18 clusters, and the center point in the φ direction of each such cluster defines the location of an alignment line 30. As explained in relation to FIG. 7, the present Applicant has realized that the spatial resolution of the interaction pattern may be improved by reducing the amount of interpolation in the φ direction. At the same time, it may be desirable to limit the number of processing operations that are required for generating the interaction pattern. A reasonable compromise between accuracy/resolution and processing speed may be achieved by limiting the number of alignment lines to be used when generating the interpolation points, and by using cluster analysis for identifying a given number of φ-direction clusters among the sampling points within a given sub-portion in the φ-s-plane. Thus, the alignment lines in FIG. 12C represent, for the purpose of minimizing interpolation in the φ direction using 18 alignment lines, the best choice of these 18 alignment lines for the sampling points that correspond to detection lines extending between the opposite short sides of the touch surface 1 in FIG. 12A.

Figure 12C:
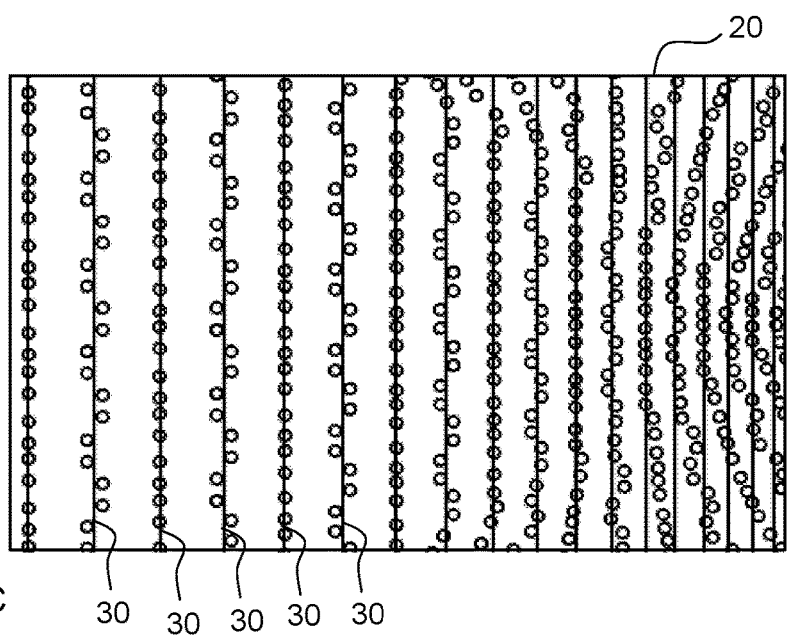
FIG. 12C is an enlarged view of FIG. 12B.
Figure 12D:
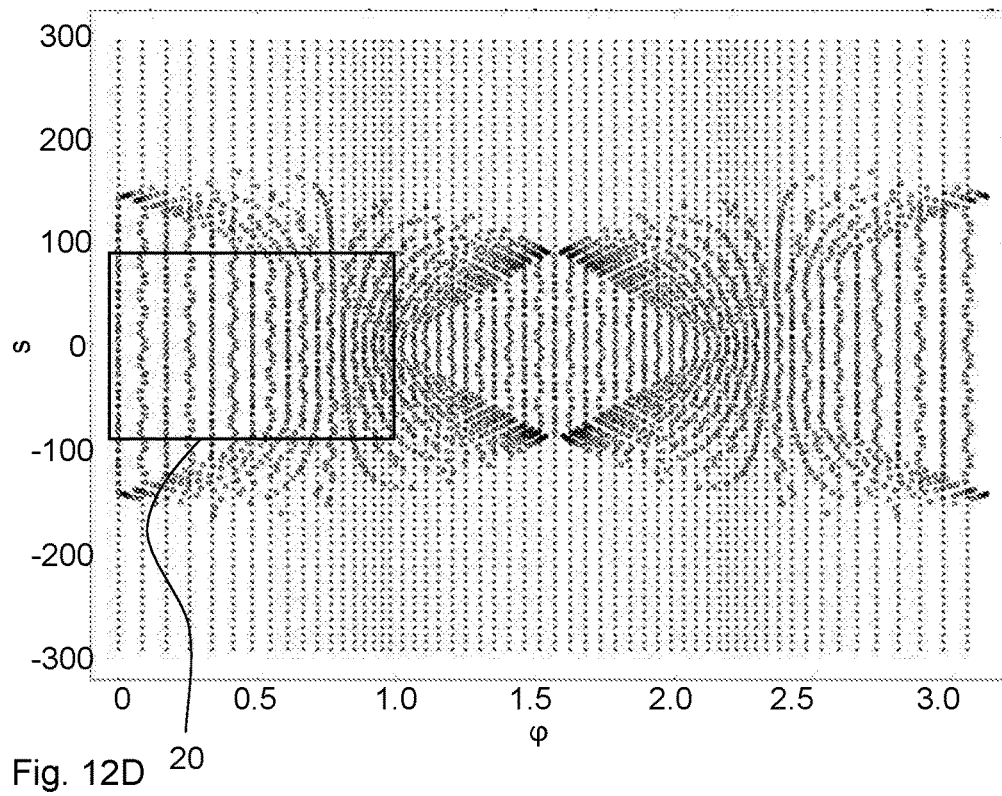
FIG. 12D is a plot corresponding to FIG. 8B.
Figure 12E:
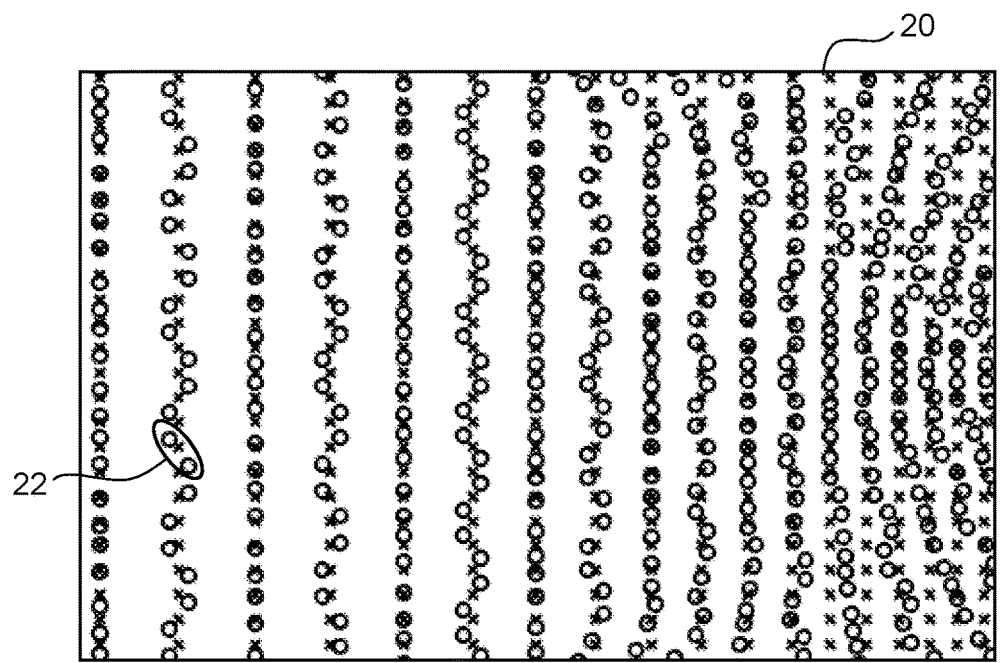
FIG. 12E is an enlarged view of FIG. 12D.

FIG. 12D shows the sampling points (circles) in the original sinogram g together with an example of interpolation points (crosses) that are defined on the alignment lines 30 in FIG. 12C. FIG. 12E is an enlarged view of the sub-area 20 in FIG. 12D to more clearly show how clustered structures in the original sinogram are used for defining the non-equispaced columns of interpolation points in the matched sinogram.

It should be noted that the outcome of the cluster analysis depends on the given number of alignment lines to be identified. For example, if the cluster analysis were set to identify 26 clusters in sub-portion 42A in FIG. 12B, the clustering algorithm would instead identify the columns of the perfectly aligned sampling points as individual clusters. The resulting alignment lines 30 are shown in the enlarged view of FIG. 12F, which corresponds to FIG. 12C. It is understood that it is matter of choice and optimization to decide on the number of clusters to be identified for a particular arrangement of emitters and sensors, based on the desired spatial resolution and processing efficiency.

Figure 13B:
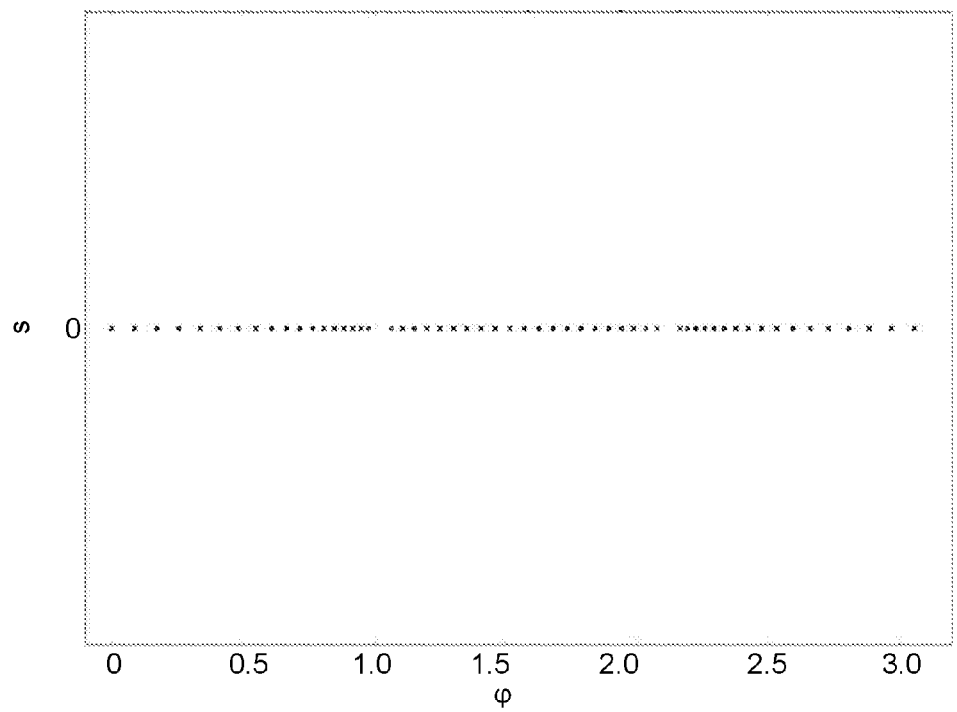
Figure 15:
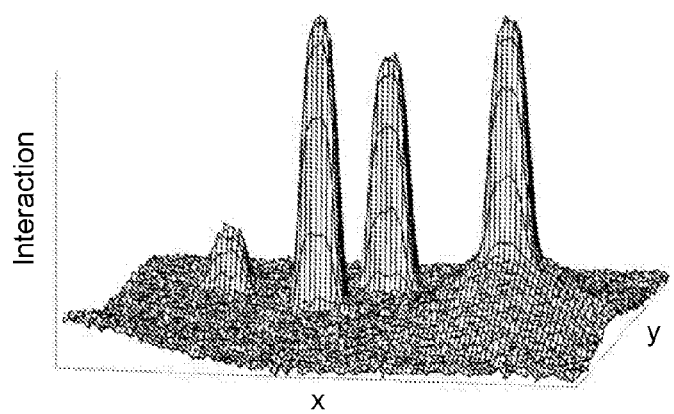
FIG. 15 shows an example of an interaction pattern.

The cluster analysis is a one-dimensional optimization, since it amounts to finding a given number of clusters in the φ direction. This is further illustrated in FIG. 13A, which corresponds to the original sinogram (FIG. 12B) but where the s dimension has been removed or collapsed for the sampling points within sub-portions 40, 42A and 42B. In other words, all sampling points in these sub-portions have been projected in the s direction onto a line that extends in the φ direction. The task of the cluster analysis is thus to identify a given number of clusters among the projected sampling points in FIG. 13A, and then calculate a location value for each cluster, where each location value defines the φ location for a respective alignment line. The location value may be obtained as any form of center point among the φ values of the sampling points that are included in the respective cluster, e.g. given as an average (weighted or non-weighted) or by a least-squares minimization of the φ values. As already indicated above, the cluster analysis will likewise identify suitable clusters when applied to original sinograms with a higher degree of parallelization in sub-portions 40, 42A and 42B, such as the sinograms in FIGS. 8A, 10B and 11B. FIG. 13B is a collapsed view of the sampling points within sub-portions 40, 42A and 42B in FIG. 8A, illustrating the projected sampling points that are processed in such a cluster analysis. Clearly, the cluster analysis will be able to identify the location values of the alignment lines in FIG. 8B based on the projected sampling points in FIG. 13B, provided that a proper number of clusters are selected. In the examples in FIGS. 13A-13B, the clusters are spaced-apart in the φ direction. This is not a strict requirement for the clusters, but may be preferable since it produces more distinct clusters, which in turn will reduce the interpolation in φ direction when the matched sinogram is generated.

It should be noted that the above-described use of selective 1D interpolation within sub-portions 40, 42A and 42B may be slightly modified when the alignment lines do not coincide with the sampling points. Instead of a strict 1D interpolation with respect to the s dimension, i.e. along the respective alignment line, the 1D interpolation may be substituted for a "limited 2D interpolation" in which only sampling points that are associated with a particular alignment line are allowed to contribute to interpolation points on this alignment line (within sub-portion 40, 42A, 42B). Thus, in a sense, the limited 2D interpolation is one-dimensional with respect to the alignment line. For example, a limited 2D interpolation function may generate each interpolated value at an interpolation point on an alignment line as a weighted combination of observed values for the two (or more) nearest sampling points that are associated with this alignment line. In FIG. 12E, the encircled area 22 contains the two sampling points (circles) that may contribute to the interpolation point (cross) in the encircled area 22.

The signal processor 10, shown in FIGS. 1-2, implements the use of the above-described alignment lines in the tomographic reconstruction. FIG. 14A is a flowchart of an embodiment of a method that is carried out by the signal processor 10 during operation of the touch-sensitive apparatus 100. The method involves a sequence of steps 50-58 that are repeatedly executed. Each sequence of steps 50-58 is denoted a "frame".

Each frame starts by a data collection step 50, in which current measurement values are acquired from the sensors 3 in the apparatus 100. The measurement values represent detected energy, or an equivalent quantity such as power or intensity, for a set of detection lines. The measurement values may, but need not, be collected for all available detection lines in the apparatus 100. Step 50 may also include pre-processing of the measurement values, e.g. filtering for noise reduction, as well as formatting of the measurement values into a format adapted to the reconstruction function that is used (in the step 56, below) for generating the interaction pattern. The format may represent a decrease in signal energy caused by the interaction between touching objects and detection lines. In one implementation, the format is given as the (negative) logarithm of the signal transmission for the detection line, where the signal transmission is given by the measurement value normalized by a reference value. It can be shown that this format allows the interaction pattern to represent attenuation. In alternative implementations, the format may be given as a transmission (e.g. given by the measurement value normalized by the reference value), an energy difference (e.g. given by the difference between the measurement value and the reference value), or a logarithm of the energy difference. Irrespective of format, the data collection step 50 results in current "observed values" for the set of detection lines.

In step 52, the observed values are stored in a first data structure in the electronic memory 14. When populated with the observed values, the first data structure represents the original sinogram g for the apparatus 100, as obtained in the current frame. As explained above, the original sinogram g maps the observed values, which are acquired by step 50, to unique combinations of values for the $\varphi$ and s parameters, where each unique combination represents one of the detection lines. Thus, the first data structure associates observed values with $(\varphi, s)$ values. It should be noted that the first data structure and its $(\varphi, s)$ values are predefined for the apparatus 100. The $(\varphi, s)$ values for each detection line are typically determined theoretically, i.e. based on the extent of each detection line as given by the predefined locations of the incoupling and outcoupling ports in the x, y coordinate system of the touch surface.

In step 54, the original sinogram is processed for generation of a matched sinogram, which is implemented by a second data structure that maps interpolated values to interpolation points in the $\varphi$-s-plane. The interpolation points are defined by such $(\varphi, s)$ values that the interpolation points are located on non-equidistantly spaced alignment lines in the $\varphi$-s-plane, according to the principles described and exemplified above with reference to FIGS. 7-13. As understood from the foregoing discussion, the alignment lines are predefined with respect to the original sinogram g, and may be set with a given relation to existing columnated clusters or columns of sampling points in the original sinogram g. Thus, the second data structure and its $(\varphi, s)$ values are predefined for the apparatus 100. Basically, step 54 executes a predefined interpolation among the observed values in the first data structure (original sinogram) to generate the interpolated values in the second data structure (matched sinogram). As noted above, the interpolation may produce an interpolated value for the respective interpolation point as a weighted combination of the observed values of two or more sampling points in the neighborhood of the respective interpolation point (cf. FIG. 7A). As also explained above, step 54 may apply different interpolation functions in different regions of the $\varphi$-s-plane. A first interpolation function may be designed to generate the interpolated values within the sub-portions 40, 42A and 42B by 1D interpolation along the respective alignment line (i.e. in the s direction). A second interpolation function may be designed to generate the interpolated values outside these sub-portions by 2D interpolation. Also, certain interpolation points outside the sub-portions 40, 42A and 42B may be preset to a value that indicates absence of interaction.

It is also worth noting that steps 52 and 54 allow for dynamic removal of certain sampling points in the original sinogram g during operation of the method. As suggested in aforesaid WO2011/139213, the apparatus may be provided with an ability of identifying faulty detection lines, i.e. detection lines that are deemed to cause problems in the reconstruction process and/or introduce major errors in the interaction pattern. For example, if an emitter or a sensor starts to perform badly, or not at all, during operation of the apparatus, this may have a significant impact on the interaction pattern. The apparatus may implement an error handling that validates the detection lines, e.g. every n:th frame ($n \geq 1$), and dynamically assigns a valid or invalid state to each detection line (sampling point) depending on the outcome of the validation. When a sampling point is set to an invalid state, step 54 may remove it from the original sinogram g and/or step 56 may disregard the observed value for the invalid sampling point when computing the interpolated values. Thereby, the sampling point is not used for computing the interpolated values of the matched sinogram, at least until the sampling point is again set to the valid state.

In step 56, the interaction pattern is reconstructed within the touch surface by operating a tomographic reconstruction function on the matched sinogram. The interaction pattern may be reconstructed within the entire touch surface or within one or more selected subareas thereof. An example of an interaction pattern is given in the 3D plot of FIG. 14, which depicts a distribution of attenuation values on the touch surface of a planar light guide (cf. 4 in FIG. 2) of an FTIR system. The distinct peaks of increased attenuation represent fingers in contact with the touch surface. Any available algorithm for tomographic reconstruction in a parallel geometry may be utilized in step 56, e.g. Filtered Back Projection (FBP), Fourier-based algorithms, ART (Algebraic Reconstruction Technique), SART (Simultaneous Algebraic Reconstruction Technique), SIRT (Simultaneous Iterative Reconstructive Technique), etc. More information about these and other algorithms can be found in the reference books on the subject. Implementations of FBP, and variants thereof, are also presented in aforesaid WO2011/139213. Fourier-based algorithms that are optimized with respect to processing speed and memory-usage are disclosed in Applicant's co-pending applications WO2013133756 and WO2013133757, filed on 7 Mar. 2013, which are both incorporated herein by reference.

In an extraction step 58, the interaction pattern is then processed for identification of touch-related features and extraction of touch data. Any known technique may be used for isolating true (actual) touches within the interaction pattern. For example, ordinary blob detection and tracking techniques may be used for determining the touches, including thresholding, clustering, edge detection, shape matching, etc. Step 58 may also involve an initial processing of the interaction pattern for noise removal and/or image enhancement. Any available touch data may be extracted, including but not limited to x, y coordinates, areas and shapes of the touches.

After step 58, the extracted touch data is output, and the process returns to the data collection step 50.

It is to be understood that one or more of steps 50-58 may be effected concurrently. For example, the data collection step 50 of a subsequent frame may be initiated concurrently with any of steps 52-58.

FIG. 14B shows an example of a signal processor (data processing device) 10 for executing the process in FIG. 14A. In the illustrated example, the signal processor 10 includes an input 500 for receiving the output signal from the arrangement of sensors in the touch-sensitive apparatus. The signal processor 10 further includes a data collection element (or means) 502 for processing the output signal to generate current observed values for the set of detection lines, and a population element (or means) 504 for populating the above-mentioned first data structure by the current observed values so as to generate a current original sinogram g. There is also provided an interpolation element (or means) 506 for operating the above-mentioned interpolation function(s) on the observed values so as to generate a current matched sinogram with interpolation points arranged on the non-equispaced alignment lines. The signal processor 10 further includes a tomographic reconstruction element (or means) 508 for generating a current interaction pattern based on the current matched sinogram, and an output 510 for outputting the current interaction pattern. In the example of FIG. 14B, the actual extraction of touch data is carried out by a separate device 10' which is connected to receive the current interaction pattern from the signal processor 10.

The signal processor 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, and serve as another element/means when executing another instruction. In addition, one element/means may be implemented by one instruction in some cases, but by a plurality of instructions in other cases. A software-controlled signal processor 10 may include one or more processing units (cf. 13 in FIGS. 1-2), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The signal processor 10 may further include a system memory (cf. 14 in FIGS. 1-2) and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the first and second data structures, the interpolation function(s) as well as other data structures, parameters and variables that are used when the method in FIG. 13A is executed may be stored or defined in the system memory, or on other removable/non-removable volatile/non-volatile computer storage media which is included in or accessible to the signal processor 10, such as magnetic media, optical media, flash memory cards, digital tape, solid state RAM, solid state ROM, etc. The signal processor 10 may include one or more communication interfaces, such as a serial interface, a parallel interface, a USB interface, a wireless interface, a network adapter, etc, as well as one or more data acquisition devices, such as an A/D converter. The special-purpose software may be provided to the signal processor 10 on any suitable computer-readable medium, including a record medium, or a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the present invention is not limited to any particular placement, any particular ordering, or installation of any particular number of emitters and sensors, respectively, on the different sides of the touch surface. However, in certain embodiments, the placement and/or ordering and/or number may be selected to achieve a given degree of parallelism among the detection lines that extend between opposite sides. It may be noted that it is possible to arrange, if desired, an emitter and a sensor in the same position at the perimeter of the touch surface. For example, in the FTIR system of FIG. 2, a light emitter 2 and a light detector 3 may be optically coupled to the planar light guide 4 through different surfaces of the light guide, e.g. the bottom surface 6 and the edge surface that connects the top and bottom surfaces 5, 6.

It is conceivable that the inventive principle of designing the matched sinogram based on non-equidistant alignment lines in the original sinogram is only applied for a confined range of $\varphi$ values in the matched sinogram. For example, the interpolation points may be arranged on non-equidistant alignment lines within the $\varphi$ range spanned by sub-portion 40 (or a sub-range thereof), whereas the interpolation points may be arranged in columns according to other principles, e.g. equidistantly, outside this $\varphi$ range. For example, in the original sinograms shown in FIGS. 8A, 10B, 11B and 12B, it may be noted that an additional alignment line, which is not given by a column of sampling points within sub-portions 40, 42B and 42B in the respective original sinogram, is added between sub-portion 40 and sub-portion 42A and between sub-portion 40 and sub-portion 42B. These additional alignment lines may be set with equidistant spacing to the neighboring alignment lines, or they may be set to extend though at least two sampling points (if present) for the detection lines that extend between adjacent sides of the touch surface.

The invention claimed is:

1. A touch-sensitive apparatus comprising:
   a panel;
   a plurality of light emitters and a plurality of light detectors arranged at a periphery of the panel, wherein the plurality of light emitters are configured to transmit light signals to a plurality of light detectors to define detection lines that extend across a non-circular touch surface on the panel between pairs of the plurality of light emitters and the plurality of light detectors, and wherein the plurality of light detectors are configured to generate an output signal based on the transmitted light signals; and
   a hardware processor configured to:
      generate a set of observed values for at least a subset of the detection lines based on the output signal, wherein the observed values correspond to sampling points in a two-dimensional sample space, in which a first dimension is defined by an angle parameter that represents a rotation angle of the detection line in a plane of the panel and a second dimension is defined by a distance parameter that represents a distance of the detection line in the plane of the panel from a predetermined origin;
      generate estimated values for matched sampling points in the two-dimensional sample space based on interpolation of the observed values, wherein the matched sampling points are arranged to form a plurality of columns of matched sampling points in the two-dimensional sample space, wherein the plurality of columns of matched sampling points extend in the second dimension and include a spacing between immediately adjacent columns in the first dimension, and wherein the spacing between the immediately adjacent columns is variable in the plurality of columns of matched sampling points, and wherein at least some of the plurality of columns of matched sampling points are arranged to coincide with alignment lines that are defined by locations of the sampling points in the two-dimensional sample space;
      execute a tomographic reconstruction function on the estimated values for the matched sampling points; and generate a two-dimensional representation of touch interaction on the touch surface based on the executed tomographic reconstruction function.

2. The touch-sensitive apparatus of claim 1, wherein the respective alignment line is defined to extend through at least two sampling points in the two-dimensional sample space.

3. The touch-sensitive apparatus of claim 1, wherein the respective alignment line is defined to extend through at least two sampling points that are aligned with respect to the first dimension in the two-dimensional sample space.

4. The touch-sensitive apparatus of claim 1, wherein the respective alignment line is defined by sampling points that represent detection lines that extend in parallel across the touch surface.

5. The touch-sensitive apparatus of claim 1, wherein the touch surface is quadrilateral and comprises at least two opposite sides that are essentially parallel and at least two adjacent sides, and wherein the plurality of light emitters and the plurality of light detectors are arranged along a perimeter of the touch surface, such that the detection lines extend between the at least two opposite sides and between the at least two adjacent sides of the touch surface, wherein the alignment lines are defined by the detection lines that extend between the at least two opposite sides.

6. The touch-sensitive apparatus of claim 5, wherein the detection lines that extend between the at least two opposite sides correspond to sampling points that are located within one or more confined sub-portions of the two-dimensional sample space, wherein the sampling points within the one or more confined sub-portions form a plurality of columnated clusters of sampling points, and wherein the alignment lines are defined to be co-located with a respective columnated cluster of sampling points.

7. The touch-sensitive apparatus of claim 6, wherein the columnated clusters correspond to disjoint sets of sampling points within the one or more confined sub-portions.

8. The touch-sensitive apparatus of claim 6, wherein the columnated clusters are spaced-apart in the first dimension within the one or more confined sub-portions.

9. The touch-sensitive apparatus of claim 6, wherein the columnated clusters are identified by cluster analysis among the sampling points within the one or more sub-portions, wherein the cluster analysis is configured to identify a predefined number of columnated clusters by clustering the sampling points only based on the value of the angle parameter for the respective sampling point.

10. The touch-sensitive apparatus of claim 6, wherein the plurality of light emitters and the plurality of light detectors are arranged such that the detection lines that extend between the at least two opposite sides of the touch surface form groups of detection lines with mutually different rotation angles in the plane of the panel, wherein the detection lines within the respective group have mutually similar rotational angles, and wherein the columnated clusters correspond to the groups of detection lines.

11. The touch-sensitive apparatus of claim 10, wherein at least a subset of the groups consist of mutually parallel detection lines, wherein at least a subset of the columnated clusters consist of a respective column of sampling points in the tow-dimensional sample space, and wherein at least a subset of the alignment lines are defined to coincide with the columns of sampling points.

12. The touch-sensitive apparatus of claim 6, wherein the signal processor is configured to apply a first interpolation function to generate the estimated values for matched sampling points that are located within at least one of the one or more confined sub-portions and apply a second interpolation function to generate the estimated values for matched sampling points that are located outside the one or more confined sub-portions.

13. The touch-sensitive apparatus of claim 12, wherein the first interpolation function is configured to generate the estimated value for the respective matched sampling point on a given alignment line by interpolation only among observed values for the sampling points within the columnated cluster that defines the given alignment line, and wherein the second interpolation function is configured to generate the estimated value for the respective matched sampling point by interpolation among observed values for the sampling points that are located outside the one or more confined sub-portions.

14. The touch-sensitive apparatus of claim 12, wherein each columnated cluster consists of a column of sampling points in the two-dimensional sample space, wherein the respective alignment line is defined to coincide with a respective column of sampling points, wherein the first interpolation function is configured to generate the estimated value for the respective matched sampling point by interpolation only among sampling points that are only displaced in the second dimension from the respective matched sampling point, and wherein the second interpolation function is configured to generate the estimated value for the respective matched sampling point by interpolation among observed values for sampling points that are displaced in any of the first and second dimensions from the respective matched sampling point.

15. The touch-sensitive apparatus of claim 1, wherein the hardware processor is further configured to generate the estimated value for the respective matched sampling point as a weighted combination of the observed values for a respective set of sampling points.

16. The touch-sensitive apparatus of claim 15, wherein the signal processor is configured to generate the weighted combination for the respective matched sampling point by applying a weight factor to the observed value for each sampling point in the respective set of sampling points, wherein the weight factor is a function of a distance in the two-dimensional sample space between the respective matched sampling point and said each sampling point.

17. The touch-sensitive apparatus of claim 1, wherein the hardware processor is further configured to generate the observed values to be indicative of a decrease in signal energy caused by objects in contact or proximity with the touch surface.

18. A method of enabling touch determination on a non-circular touch surface of a panel, wherein a plurality of light emitters and a plurality of light detectors are arranged at a periphery of the panel, the plurality of light emitters are configured to transmit light signals to a plurality of light detectors to define detection lines that extend across the non-circular touch surface on the panel between pairs of the plurality of light emitters and the plurality of light detectors, the method comprising:

receiving an output signal generated from the plurality of light detectors based on the transmitted light signals;

generating a set of observed values based on the output signal for at least a subset of the detection lines, wherein the observed values correspond to sampling points in a two-dimensional sample space, in which a first dimension is defined by an angle parameter that represents a rotation angle of the detection in the plane of the panel, and a second dimension is defined by a distance parameter that represents a distance of the detection line in a plane of the panel from a predetermined origin;

generating estimated values for matched sampling points in the two-dimensional sample space based on interpolation of the observed values, wherein the matched sampling points are arranged to form a plurality of columns of matched sampling points in the two-dimensional sample space, wherein the plurality of columns extend in the second dimension and include a spacing between immediately adjacent columns in the first dimension, and wherein the spacing between the immediately adjacent columns is variable in the plurality of columns of matched sampling points, and wherein at least some of the plurality of columns of matched sampling points are arranged to coincide with alignment lines that are defined by locations of the sampling points in the two-dimensional sample space;

executing a tomographic reconstruction function on the estimated values for the matched sampling points; and generating a two-dimensional representation of touch interaction on the touch surface based on the executed tomographic reconstruction function.

\* \* \* \* \*